United States Patent
Savaris et al.

(10) Patent No.: US 12,177,692 B1
(45) Date of Patent: Dec. 24, 2024

(54) DETECTION OF ELECTRONIC DEVICE PRESENCE USING EMITTED WI-FI SIGNALS

(71) Applicant: Ubiety Technologies, Inc., Chicago, IL (US)

(72) Inventors: Augusto Savaris, Chicago, IL (US);
Joseph Loftus, Seattle, WA (US);
Michael B. Cox, Chicago, IL (US);
Keith Puckett, Chicago, IL (US)

(73) Assignee: Ubiety Technologies, Inc., Chicago, IL (US)

(*) Notice: Subject to any disclaimer, the term of this patent is extended or adjusted under 35 U.S.C. 154(b) by 0 days.

(21) Appl. No.: 18/436,772

(22) Filed: Feb. 8, 2024

(51) Int. Cl.
*H04W 24/02* (2009.01)
*H04L 43/12* (2022.01)
*H04W 8/00* (2009.01)
*H04W 84/12* (2009.01)

(52) U.S. Cl.
CPC .......... *H04W 24/02* (2013.01); *H04L 43/12* (2013.01); *H04W 8/005* (2013.01); *H04W 84/12* (2013.01)

(58) Field of Classification Search
CPC ..... H04W 24/02; H04W 8/005; H04W 84/12; H04L 43/12
See application file for complete search history.

(56) References Cited

U.S. PATENT DOCUMENTS

| | | |
|---|---|---|
| 10,109,166 B1 | 10/2018 | Selinger et al. |
| 10,304,303 B2 | 5/2019 | Selinger et al. |
| 10,382,282 B1 | 8/2019 | Levy-Yurista |
| 11,792,455 B1 | 10/2023 | Fu |
| 2013/0128311 A1 | 5/2013 | Kim |
| 2014/0046711 A1 | 2/2014 | Borodow |
| 2017/0223754 A1 | 8/2017 | Li |
| 2020/0045647 A1 | 2/2020 | Gupta |
| 2020/0238991 A1* | 7/2020 | Aragon ............... G06V 10/454 |
| 2021/0136178 A1* | 5/2021 | Casey ................. G06F 9/5077 |
| 2022/0051548 A1 | 2/2022 | Pellegrini |
| 2023/0316726 A1 | 10/2023 | Selinger |
| 2023/0351873 A1 | 11/2023 | Vazirani |

OTHER PUBLICATIONS

A Study on Device Identification from BLE Advertising Packets with Randomized MAC Addresses Akiyama et al. (Year: 2021), 4 pgs.

\* cited by examiner

*Primary Examiner* — Mohammad S Anwar
(74) *Attorney, Agent, or Firm* — Perkins Coie LLP

(57) ABSTRACT

Machine learning-based methods are disclosed to identify and/or count a number of electronic devices present in an area using emitted passive Wi-Fi signals. The identification and/or counting of Wi-Fi-enabled devices improves private and public security in determining human presence. The disclosed methods use trained machine learning models that learns the relationship between real-time Wi-Fi probe request broadcast behavior distribution and the number of electronic devices present. The disclosed methods can include use of other wireless data transfer protocols, such as Bluetooth and Cellular.

20 Claims, 12 Drawing Sheets

DETECTION OF ELECTRONIC DEVICE PRESENCE USING EMITTED WI-FI SIGNALS

BACKGROUND

Traditional home and business security systems often lack a reliable way to quickly and easily assess the presence of people in a house or business, leading to high false-alarm rates, account churn, and low customer satisfaction. Motion and magnetic sensors can sometimes be inadequate to identify details of intruders. Moreover, traditional surveillance systems can be invasive, expensive, as well as misidentify intruders. As a result, homeowners and business owners using conventional security systems can sometimes attempt to resolve high-risk intruder situations using inconclusive information, resulting in added stress and fear.

BRIEF DESCRIPTION OF THE DRAWINGS

Detailed descriptions of implementations of the present technology will be described and explained through the use of the accompanying drawings.

Figure 1:
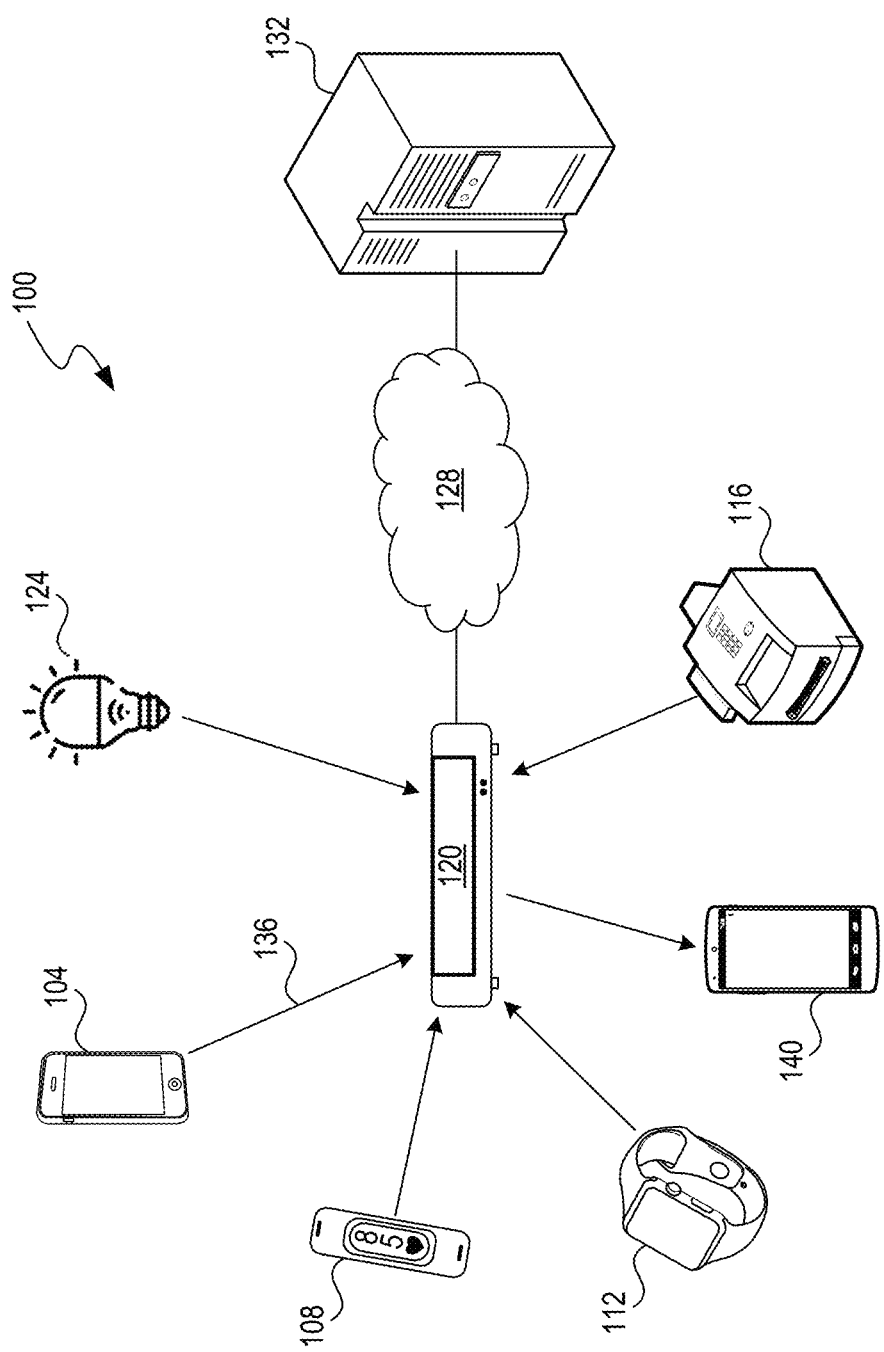
FIG. 1 is a block diagram that illustrates an example system that can implement aspects of the present technology.

The technologies described herein will become more apparent to those skilled in the art from studying the Detailed Description in conjunction with the drawings. Embodiments or implementations are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

This document discloses methods, systems, and apparatuses for improved detection of electronic device presence. The disclosed apparatuses listen for electronic device activity across a spectrum of frequency ranges. Traditional methods for device detection based on identifying unique Wi-Fi probe request signatures are typically inadequate when multiple electronic devices of the same type are present. Using the disclosed systems, however, sensed device activity can include Wi-Fi signaling, cellular signaling, Bluetooth signaling, network discovery, and/or Wi-Fi fingerprinting. By listening for active and/or passive signals emitted by devices, the disclosed apparatuses collect pseudonymous attributes and identifiers from devices and networks. The disclosed methods augment device detection with context determined through artificial intelligence (AI) using both real-world and synthetically-generated data to expand anomaly detection and overall understanding of presence.

In some embodiments, a computer system detects that one or more electronic devices are present near a Wi-Fi receiver. A Bluetooth receiver is used in some implementations. The computer system includes at least one hardware processor and at least one non-transitory computer-readable storage medium storing instructions. The instructions, when executed by the at least one hardware processor, cause the computer system to receive, via the Wi-Fi receiver, multiple Wi-Fi probe requests emitted by the electronic devices. Bluetooth or cellular signals are used in some implementations. The Wi-Fi probe requests include multiple metadata fields including multiple data values. A feature vector is extracted from the data values. The feature vector is indicative of a number of the electronic devices present. A machine learning model is used to determine the number of the electronic devices based on the feature vector. The machine learning model is trained based on a training set generated previously from Wi-Fi probe requests. The number of the electronic devices determined to be present is sent to a user device. An application executing on the user device generates a graphical representation on a screen of the user device. The graphical representation describes the electronic devices present in proximity to the Wi-Fi receiver.

In some embodiments, a computer-implemented method for training a machine learning model is performed. The method includes collecting Wi-Fi probe requests emitted by multiple electronic devices. Bluetooth or cellular signals are used in some implementations. The electronic devices can have different makes and/or models. Multiple features are extracted from the Wi-Fi probe requests. The features are indicative of a number of the electronic devices present. The machine learning model is trained using the features. The machine learning model is trained to determine a number of the electronic devices present. The machine learning model is stored on a computer system to determine presence during functional operation of one or more other electronic devices in proximity to a Wi-Fi receiver based on a feature vector extracted from Wi-Fi probe requests received from the other electronic devices.

In some embodiments, a computer-implemented method is performed for generating a training set for a machine learning model. The method includes collecting Wi-Fi probe requests emitted by multiple electronic devices across multiple timeframes. Bluetooth or cellular signals are used in some implementations. The electronic devices can have different makes and/or models. The Wi-Fi probe requests include multiple metadata fields. Multiple features are extracted from the Wi-Fi probe requests. The features are indicative of a number of the electronic devices. The features are combined with information indicating the makes and/or models into the training set to train the machine learning model. The training set is stored on a computer system to train the machine learning model. The machine learning model is trained to determine a number of one or more other electronic devices (in functional operation or mission mode) based on a feature vector extracted from Wi-Fi probe requests emitted by the other electronic devices.

The benefits and advantages of the implementations described herein include real-time and more accurate insights into people's and devices' presence. Because mobile electronic devices are a strong indication of presence, the disclosed methods for detection and identification reduce unnecessary alerts and costly false-alarm dispatches. By adding "known" devices to their profiles, users obtain increased insight into when an electronic device enters their homes and whom it belongs to. Moreover, the disclosed systems provide value outside of security threats, informing busy homeowners when teens arrive safely from school, if a nanny is late, or if other home awareness concerns arise. The disclosed cloud IoT platform provides updates to computer devices and sensors (e.g., software, firmware, OS, or kernel updates), monitors the health of computer devices and sensors in real-time, and adapts the system's performance using specialized microservices. In addition, a unique cloud environment and encryption codes are created for each computer device to support data privacy and security.

The disclosed systems transform radio frequency signals using AI into valuable insights and actionable data. The disclosed cloud infrastructure can process raw data and scale in real-time. The cloud infrastructure provides a backbone to the presence detection ecosystem, translating raw data to insights at high levels of reliability, efficiency, and accuracy. The disclosed data ecosystem is enriched with multiple insights and scenarios to enhance precision using the collected signal data. In some implementations, the data ecosystem is enriched with insights synthetically using a synthetic data generation platform, which can simulate multiple scenarios, equipping the data platform to process highly probable as well as improbable situations with accuracy. The disclosed apparatuses can be used as a standalone solution or as an addition to existing security systems to reduce false detections and enhance the context of alerts.

In addition, operation of the disclosed apparatuses causes a reduction in greenhouse gas emissions compared to traditional methods for presence detection. Every year, approximately 40 billion tons of $CO^2$ are emitted around the world. Power consumption by digital technologies including home and business security systems accounts for approximately 4% of this figure. Further, conventional security systems can sometimes exacerbate the causes of climate change. For example, conventional security systems that use video capture and storage increase the amount of data stored and downloaded. in the U.S., datacenters are responsible for approximately 2% of the country's electricity use, while globally they account for approximately 200 terawatt Hours (TWh). Each GB of data downloaded results in approximately 3 kg of $CO^2$ emissions or other greenhouse gas emissions. The storage of 100 GB of data in the cloud every year produces approximately 0.2 tons of $CO^2$ or other greenhouse gas emissions. Avoiding data-intensive video capture and storage using Wi-Fi signaling, cellular signaling, Bluetooth signaling, network discovery, and Wi-Fi fingerprinting instead reduces the amount of data transported and stored, and obviates the need for wasteful $CO^2$ emissions.

The implementations disclosed herein for listening to passive Wi-Fi signals emitted by devices can mitigate climate change by reducing and/or preventing additional greenhouse gas emissions into the atmosphere. In particular, by reducing unnecessary alerts and costly false-alarm dispatches, the disclosed systems provide increased efficiency compared to traditional methods. Therefore, the disclosed implementations mitigate climate change and the effects of climate change by reducing the amount of data stored and downloaded in comparison to conventional technologies.

The description and associated drawings are illustrative examples and are not to be construed as limiting. This disclosure provides certain details for a thorough understanding and enabling description of these examples. One skilled in the relevant technology will understand, however, that the embodiments can be practiced without many of these details. Likewise, one skilled in the relevant technology will understand that the embodiments can include well-known structures or features that are not shown or described in detail, to avoid unnecessarily obscuring the descriptions of examples.

FIG. 1 is a block diagram that illustrates an example system 100 that can implement aspects of the present technology. The system 100 includes electronic devices 104, 108, 82, 86, 124, a user device 140, a computer device 120, a network 128, and a cloud server 132. Likewise, implementations of the example system 100 can include different and/or additional components or be connected in different ways. The system 100 is implemented using components of the example computer system 900 illustrated and described in more detail with reference to FIG. 9.

The system 100 provides a framework for detecting presence of electronic devices using passive Wi-Fi signals. Bluetooth or cellular signals are used in some implementations. The framework trains and uses a machine learning model that can learn relationships between real-time Wi-Fi probe request broadcast behavior and a number of electronic devices present. In some implementations, a particular mean average error is observed in unseen test datasets (e.g., the training Wi-Fi probe requests described in more detail herein). The disclosed methods for device counting have applications across different industry segments because they enable tracking the presence and movement of people in an area. System 100 can be used, for example, for public and private security systems in detecting unwanted presence, logistics, and monitoring of public transportation, and even for commercial venues to understand foot-traffic patterns. The methods performed by system 100 can be implemented using other wireless data transfer protocols, such as Bluetooth and cellular, as well as short-range wireless protocols, such as NearLink, near-field communication (NFC), LPWAN, ultra-wideband (UWB), and/or IEEE 802.15.4.

The system 100 can be used to perform a computer-implemented method for training a machine learning model, sometimes referred to as an artificial intelligence (AI) model. An example AI model 830 is illustrated and described in more detail with reference to FIG. 8. For example, computer device 120 collects multiple Wi-Fi probe requests (training Wi-Fi probe requests) emitted by multiple electronic devices (training electronic devices), for example, electronic devices 104, 108, 82, 86, 124). As shown by FIG. 1, electronic device 104 emits Wi-Fi probe request 136. The electronic devices are used to engineer a feature set and train a machine learning model. Later, in functional operation or mission mode, the trained machine learning model is used to detect presence of electronic devices in real-time operation.

Computer device 120 can be a sensor device, a networking hardware device, a Wi-Fi access point, a router, a security panel, a smoke detector, a smartphone, a laptop, a desktop, or a tablet. Computer device 120 may or may not be connected to a Wi-Fi network. Computer device 120 includes a Wi-Fi receiver (sometimes referred to as a Wi-Fi receiver circuit) that can receive passive Wi-Fi signals such as Wi-Fi probe requests sent from electronic devices located in proximity to the computer device 120 even when the electronic devices are not connected to a Wi-Fi network that the computer device 120 may be connected to.

Electronic device 104 is a smartphone. Electronic device 108 is a wearable fitness device that is Wi-Fi capable. Electronic device 82 is a wearable device, such as a smartwatch, that is Wi-Fi capable. Electronic device 86 is an Internet of Things (IoT) device, such as a smart printer, that is Wi-Fi capable. The disclosed methods can monitor a wide range of wireless protocols and devices, providing insights into the presence and behavior of IoT devices. The systems disclosed herein can therefore address the challenges posed by the proliferation of IoT devices, and keep track of electronic devices and their activities.

Electronic device 124 is a smart device, such as a smart bulb, that is Wi-Fi capable. Electronic devices 104, 108, 82, 86, 120 can have different makes and/or models. User device 140 is a smartphone, tablet, laptop, or desktop capable of communicating with the computer device 120 and/or the cloud server 132. The computer device 120 is connected to the cloud server 132 via network 128, which can be a Wi-Fi network, the Internet, or a cellular network. The network 128 can be implemented using example network 914 illustrated and described in more detail with reference to FIG. 9.

In some implementations, the Wi-Fi probe requests are collected by receiving respective Wi-Fi probe requests (e.g., Wi-Fi probe request 136) from each electronic device (e.g., electronic device 104) when other electronic devices (e.g., electronic device 108) are placed in a Faraday bag or cage to prevent capture of Wi-Fi probe requests emitted by the other electronic devices. The respective Wi-Fi probe requests are aggregated to simulate presence of the electronic devices. In some implementations, the Wi-Fi probe requests are collected by receiving respective Wi-Fi probe requests from each electronic device when the electronic device and a Wi-Fi receiver are placed in a Faraday cage to prevent capture of Wi-Fi probe requests emitted by other electronic devices.

The Wi-Fi probe requests indicate Media Access Control (MAC) addresses of the electronic devices, manufacturers of the electronic devices, and/or connection capabilities of the electronic devices. The disclosed systems count the number of unique electronic devices present based on (but not exclusive to) passive Wi-Fi signals, specifically Wi-Fi probe requests. A probe request contains information such as the device's MAC address (a unique identifier), the device manufacturer, and the device's connection capabilities (e.g., data rates supported and protocol specific information). By passively listening to the broadcasted probe requests, system 100 intercepts and analyzes these signals, and determines the number of unique electronic devices present.

The computer device 120 collects a snapshot of recent probe request activity, and either the computer device 120 or the cloud server 132 extracts information about the unique data values in different probe request metadata fields. Mathematical functions are created to map the data values (features) to the number of electronic devices present are generated. In some implementations, a trained Gradient-Boosting Decision Tree (GBDT) machine learning model is used. The extracted features fed into the machine learning model represent information related to the volume of probe request activity and the variety of data values in the metadata fields observed. In some implementations, for each probe request snapshot, information about a number of unique probe requests is extracted. In addition, a number of unique MAC addresses observed, a number of unique data values observed in a metadata field, and a number of unique data value combinations observed in selected metadata fields are used as features.

Multiple features are generated (sometimes referred to as feature extraction) from the Wi-Fi probe requests. For example, the multiple features are extracted for generating a training set for a machine learning model. By analyzing RF data and employing advanced machine learning algorithms, the disclosed methods provide valuable data-driven insights. This data is used to enhance both security and the user experience. Feature engineering (or feature extraction or feature discovery) is the process of extracting features (characteristics, properties, or attributes) from raw data (e.g., Wi-Fi probe requests). Features and feature vectors are described in more detail with reference to FIG. 8. Several transformations on the raw Wi-Fi probe requests can be performed to convert the Wi-Fi probe requests to features for the machine learning model. In some implementations, aggregate statistics are generated on a cross section of Wi-Fi probe requests observed in a given timeframe. In some examples, the system 100 determines a count of Wi-Fi probe requests received in a given timeframe when a particular number of electronic devices are present. The count of the Wi-Fi probe requests can be used as a feature to train the machine learning model, or later to determine how many unique electronic devices are present.

In some examples, the system 100 determines a number of unique data values observed in metadata fields of Wi-Fi probe requests received in a given timeframe when a particular number of electronic devices are present. The number of unique data values observed can be used as an indication of how many unique electronic devices are present. In some examples, the system 100 determines a number of unique combinations of data values observed in metadata fields of Wi-Fi probe requests received in a given timeframe when a particular number of electronic devices are present. The unique combinations of data values observed can be used as an indication of how many unique electronic devices are present. In some examples, the system 100 determines statistics reflecting the cadence of Wi-Fi probe requests received in a given timeframe when a particular number of electronic devices are present. For example, the standard deviation of the elapsed time between successive Wi-Fi probe requests received can be used as an indication of how many unique electronic devices are present.

The feature generation can be performed on the computer device 120 and/or the cloud server 132. Information describing the Wi-Fi probe requests can be sent from the computer device 120 to the cloud server 132 after the computer device 120 collects the Wi-Fi probe requests, such that feature generation is performed on the cloud server 132. The Wi-Fi probe requests include multiple metadata fields. For example, data values extracted from the metadata fields indicate radio frequencies and/or data rates supported by the electronic devices. Such data values can be used as features or portions of a feature vector.

In some implementations, the features indicate a unique data value present in one of the metadata fields during at least one of the timeframes. In some implementations, the features generated indicate data values of multiple metadata fields in at least one of the multiple Wi-Fi probe requests associated with a particular frequency channel. Using the data values in a Wi-Fi probe request associated with a particular frequency channel to train the machine learning model reduces a regression error of the machine learning model. In some implementations, the features indicate a mode (most common value) of data values present in one of the metadata fields.

The features generated are indicative of a number of the electronic devices present. The system 100 determines how many unique electronic devices are present in proximity to the computer device 120. For example, computer device 120 is in a home or business. The Wi-Fi probe requests are collected across one or more timeframes. In some implementations, the generated features indicate a cadence of the Wi-Fi probe requests across a single timeframe or different timeframes. A constant value can be used to fill in training data associated with at least one of the metadata fields that lacks a data value. The constant value is used by the machine learning model to track which makes and/or models of electronic devices issue Wi-Fi probe requests having a metadata field lacking a data value.

A training set generated from the features is stored on a computer system (e.g., cloud server 132) to train the machine learning model. The machine learning model is trained to determine a number of one or more electronic devices present in functional operation. Determining the number is performed based on a feature vector extracted from Wi-Fi signals emitted by the electronic devices. Storing the training set on the computer system can cause a reduction in greenhouse gas emissions compared to traditional home security methods that store training video images captured by cameras in proximity to the electronic devices. For example, avoiding data-intensive video capture and storage using the Wi-Fi signaling methods disclosed herein reduces the amount of data transported and stored, and reduces $CO^2$ emissions caused by datacenters.

The expected number and types of electronic devices present can impact the prediction value of each of the input features at different moments in time. Through training, the machine learning model learns and analyzes patterns, picks up on the relationships between the features and the number of electronic devices, and can determine a number of unique electronic devices present based on observed values of the features. Once system 100 is deployed with the trained model in place, the model can estimate the number of electronic devices present based on Wi-Fi probe request snapshots captured and the extracted features.

The machine learning model can be trained using the generated features with information indicating the makes and/or models of the electronic devices. In some examples, the features are combined with information indicating the makes and/or models of the electronic devices into a training set to train the machine learning model. The information indicating the makes and/or models can also be used for model validation or as expected results for the machine learning model. AI and machine learning training methods are described in more detail with reference to FIG. 8. The machine learning model is trained to determine presence of and a number of unique electronic devices in proximity to a computer device (e.g., computer device 120) based on a feature vector extracted from Wi-Fi probe requests received from the electronic devices. Example AI and machine learning operation using a trained model is illustrated and described in more detail with reference to FIG. 8. In some implementations, the machine learning model is trained using the training set to detect a difference between two electronic devices having a same make and/or model.

While signals emitted by the electronic devices are used to train the machine learning model, the trained machine learning model is used to later detect presence of and count electronic devices. The Wi-Fi probe requests emitted by electronic devices are received via a Wi-Fi receiver communicably coupled to a computer system (similar to computer device 120 or the cloud server 132). Counting the number of electronic devices can be performed on computer device 120 and/or the cloud server 132. The trained machine learning model is stored on the computer system (e.g., computer device 120 or the cloud server 132) to determine presence of electronic devices in proximity to the Wi-Fi receiver. In some implementations, the machine learning model used is a gradient-boosting decision tree. A gradient-boosting decision tree can be used for solving prediction problems in both classification and regression domains. The gradient-boosting decision tree approach improves the learning process by simplifying the objective and reducing the number of iterations to get to a sufficiently optimal solution.

Figure 2:
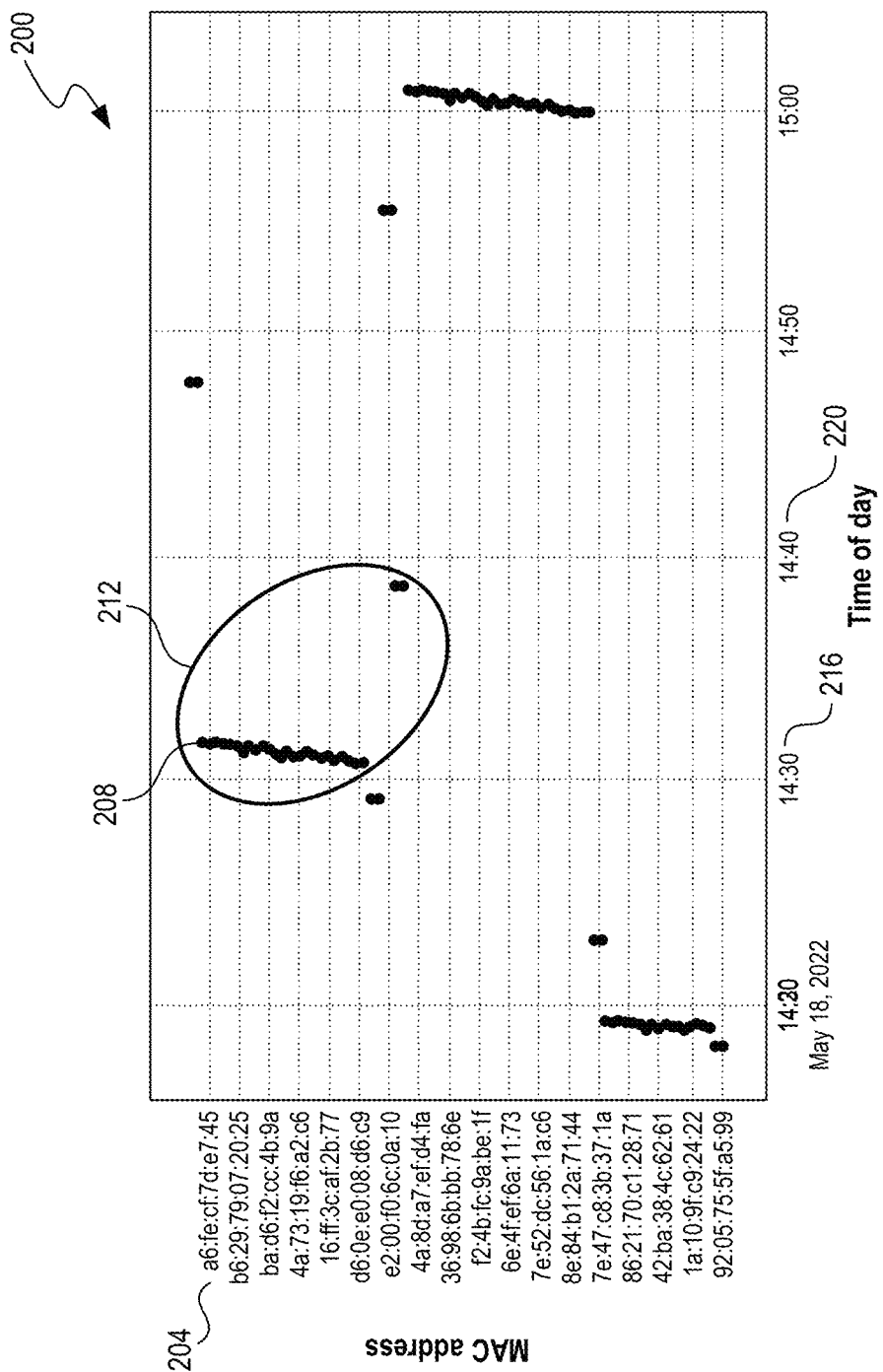
FIG. 2 is a drawing that illustrates example collected Wi-Fi probe requests emitted by electronic devices across multiple timeframes.

FIG. 2 is a drawing that illustrates example collected Wi-Fi probe requests 200 emitted by multiple electronic devices across multiple timeframes. The MAC addresses 204 shown by FIG. 2 are extracted from the collected Wi-Fi probe requests 200. Bluetooth or cellular signals are used in some implementations. For example, a group 208 of MAC addresses including the MAC address a6:fe:cf:7d:e7:45 is observed being broadcast within a short timeframe just after time 216 (14:30 hours). A group 212 of MAC addresses including group 208 is observed being broadcast within the timeframe 216-220 (14:30-14:40 hours).

The scalable and repeatable process performed by system 100 (illustrated and described in more detail with reference to FIG. 1) is used to run experiments and collect high quality training sets describing how different devices communicate using different RF protocols. By making use of Faraday cages (tools used to block ambient RF signals), emitted RF data from a single electronic device is captured, including passive Wi-Fi signals (Wi-Fi probe requests). After repeating the Wi-Fi probe request capture process across different makes and/or models of electronic devices, a high quality training set is generated that can be used as the basis for training the machine learning model.

Figure 3:
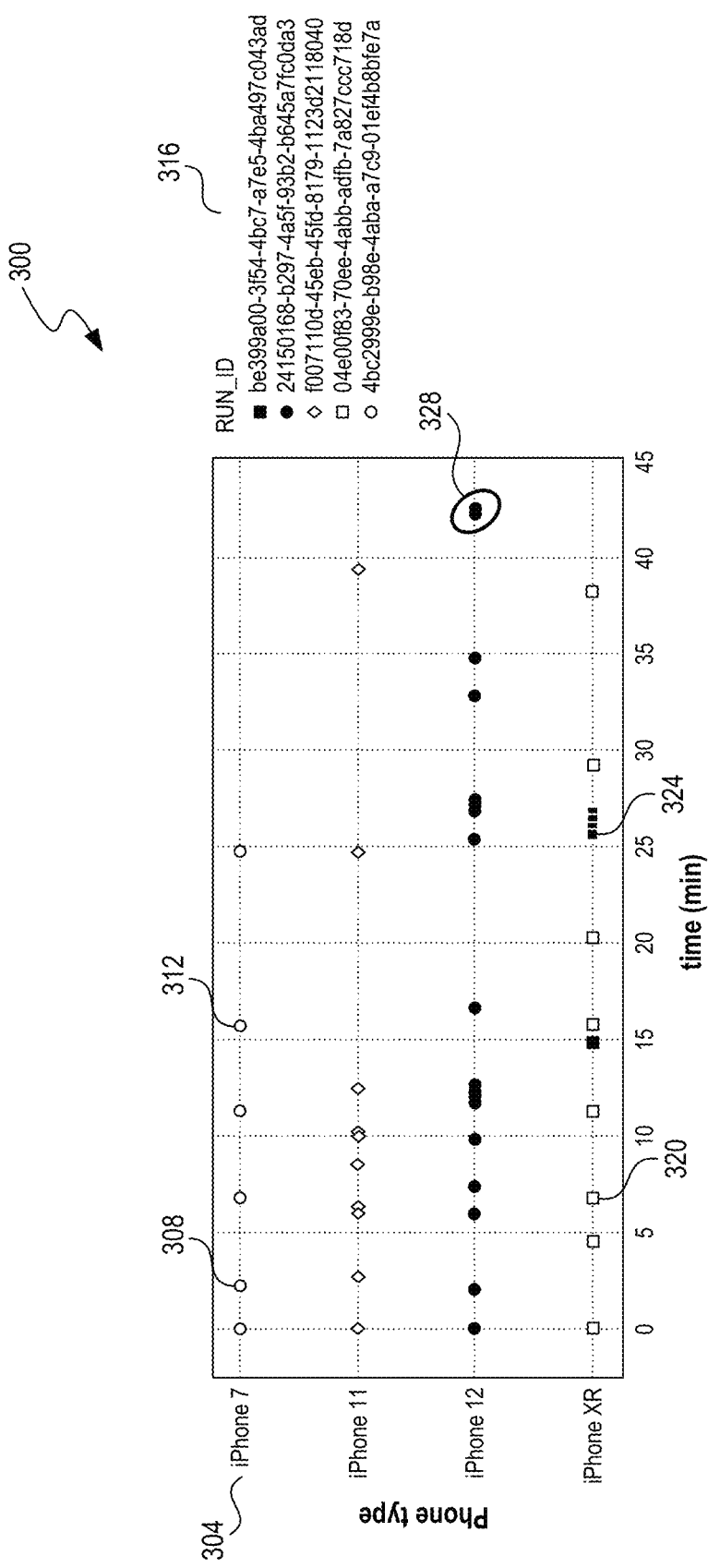
FIG. 3 is a drawing that illustrates example Wi-Fi probe requests superimposed to simulate presence of electronic devices.

FIG. 3 is a drawing that illustrates Wi-Fi probe requests superimposed to simulate presence of electronic devices. Bluetooth or cellular signals are used in some implementations. The aggregated Wi-Fi probe requests 300 displayed by FIG. 3 are to simulate presence of the electronic devices 304 shown on the Y-axis. For example, a Wi-Fi probe request 308 from the iPhone 7™ in FIG. 3 is received between the start of and five minutes into a first session. Another Wi-Fi probe request 312 from the iPhone 7™ in FIG. 3 is received between fifteen and twenty minutes into the session. A Wi-Fi probe request 320 from an iphone XR™ is received between five and ten minutes into a second session. A burst 324 of Wi-Fi probe requests from the iphone XR™ is observed between twenty and thirty minutes into the session. A short burst 328 of Wi-Fi probe requests from an iPhone 12™ is observed between forty and forty five minutes into a third session. The data captured in the first, second, and third sessions (including from other sessions) is aggregated to simulate presence of the electronic devices 304 shown on the Y-axis.

Once the Faraday cage data (aggregated Wi-Fi probe requests 300) is collected, a training set is generated for a machine learning model. By superimposing data from individual Faraday cage experiments (e.g., for the iPhone 7™ and iPhone 8™ in FIG. 3), the presence of the multiple electronic devices 304 near the Wi-Fi receiver is simulated. For example, scenarios ranging from one to twenty five different electronic devices emitting probe requests simultaneously are combined to create a baseline dataset. The scenario shown by FIG. 3 is labeled with RUN-ID 316 for feature extraction and training the machine learning model.

The types of input features generated from the aggregated probe request information over time improves the accuracy of the trained machine learning model. Each Wi-Fi probe request contains metadata fields that are meant to communicate the connection capabilities of an electronic device to an Access Point. For example, the data values in the metadata fields specify the radio frequencies and data rates that an electronic device supports. Such information is extracted from Wi-Fi probe requests and formatted to be relevant to determining the number of electronic devices present.

For example, the features extracted specify a number of times, in a relevant snapshot of time, that a unique data value was observed for each Wi-Fi probe request metadata field. The number of electronic devices present influences the number of unique data values observed in a positive manner. Similar electronic devices typically produce similar Wi-Fi probe request metadata. Hence, for example, two different iPhone 12™ devices can have the same value for a given metadata field in a Wi-Fi probe request. The total number of Wi-Fi probe requests and MAC addresses observed are also extracted as features, which enables the machine learning model to count separate instances of the same electronic device type. For example, two iPhone 12™ devices generate more Wi-Fi probe requests over time than one iPhone 12™ device.

Figure 4A:
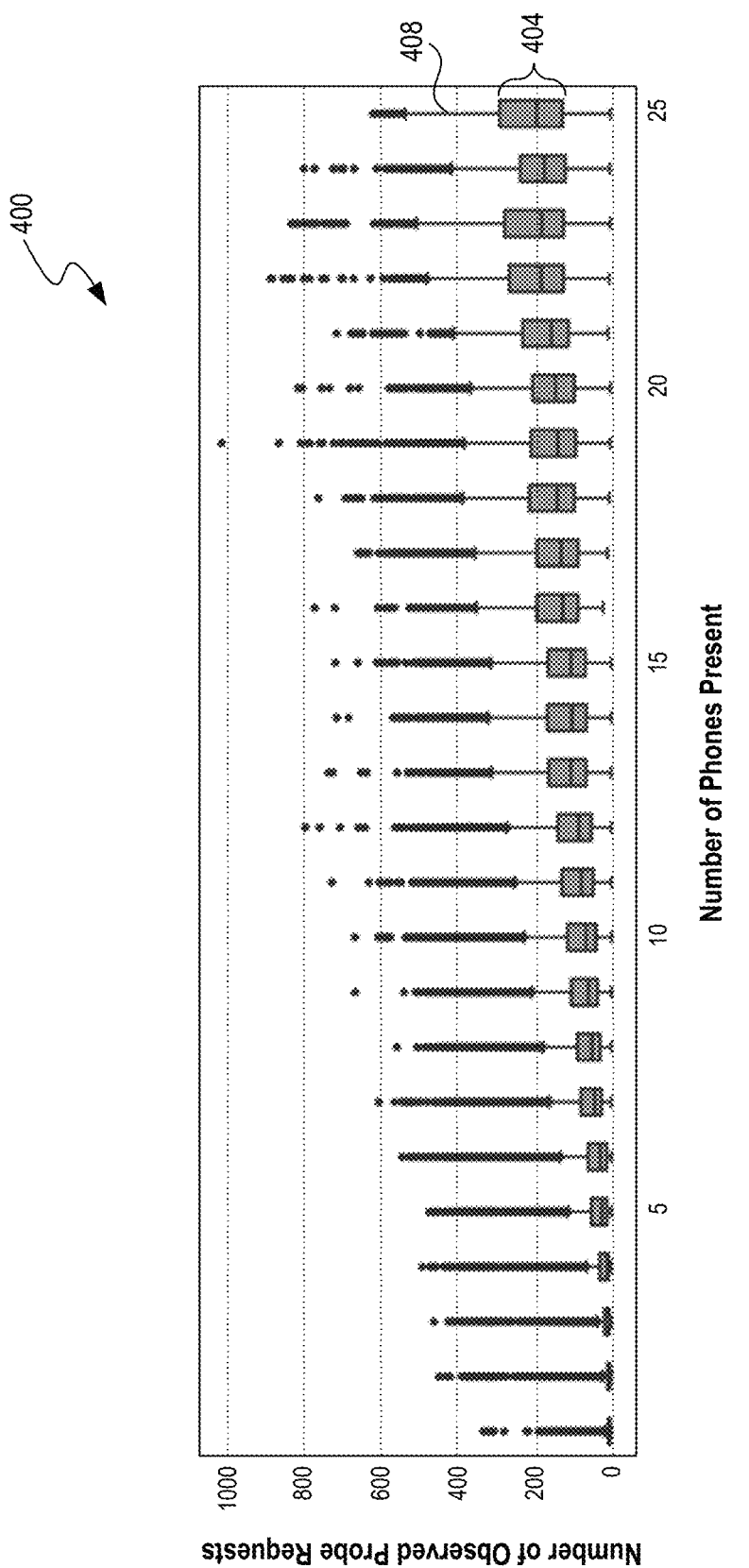
FIG. 4A is a drawing that illustrates an example box-and-whisker plot of a number of Wi-Fi probe requests observed when different numbers of smartphones are present.

FIG. 4A is a drawing that illustrates an example box-and-whisker plot 400 of the number of Wi-Fi probe requests observed when different numbers of smartphones are present. Bluetooth or cellular signals are used in some implementations. In some examples, the median number of Wi-Fi probe requests observed when 15 smartphones are present is around 100. The lower quartile below the box 404 indicates that between 0-150 Wi-Fi probe requests are observed twenty five percent of the time (lowest quartile) when twenty five smartphones are present. The box 404 indicates that between 150-200 Wi-Fi probe requests are observed twenty five percent of the time (second quartile) when twenty five smartphones are present. The box 404 indicates that between 200-300 Wi-Fi probe requests are observed twenty five percent of the time (third quartile) when twenty five smartphones are present. The whisker 408 indicates that between 300-600 Wi-Fi probe requests are observed twenty five percent of the time (top quartile) when twenty five smartphones are present. FIG. 4A also shows outlier data (e.g., displayed above whisker 408) captured for the different numbers of smartphones.

To train a machine learning model to identify meaningful patterns, the raw Wi-Fi probe requests collected are processed into features that can be consumed by the machine learning (ML) algorithm. An example AI model and example AI/ML algorithms are illustrated and described in more detail with reference to FIG. 8. The generated features are matched with information that relates to the expected number of electronic devices present in the training set. For example, a number of uniquely detected Wi-Fi probe requests, MAC addresses, and data values in other metadata fields are collected across different timeframes. In some implementations, information (features) received within the previous one minute, two minutes, three minutes, five minutes, ten minutes, etc., is collected. The machine learning model is trained to observe the input data (features) changing over time, such that the trained machine learning model can address periods of low or high Wi-Fi probe request activity. The different timeframes of information enable improved management of unpredictable broadcast cadence behavior seen in probe requests.

Figure 4B:
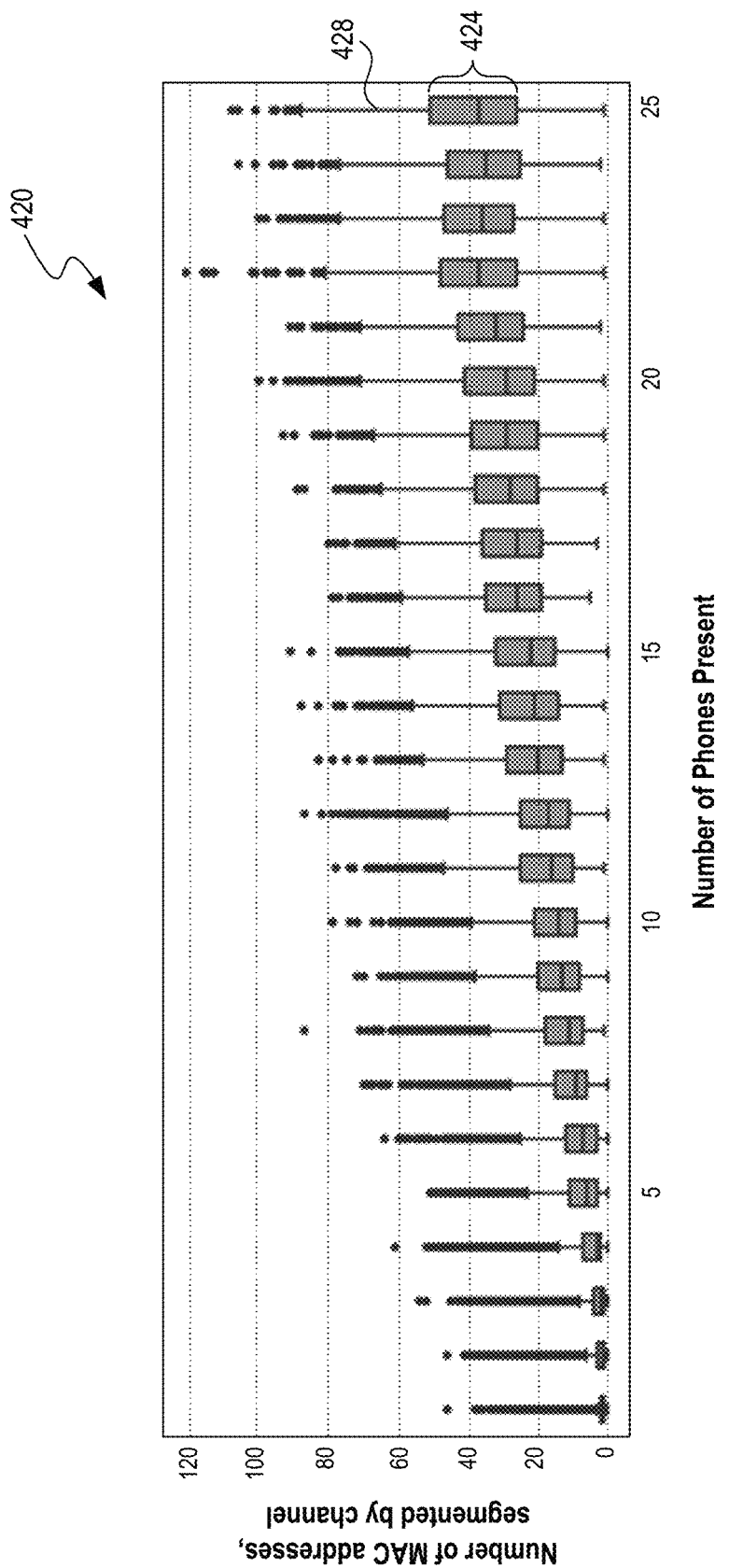
FIG. 4B is a drawing that illustrates an example box-and-whisker plot of a number of Media Access Control (MAC) addresses observed per frequency channel when different numbers of smartphones are present.

FIG. 4B is a drawing that illustrates an example box-and-whisker plot 420 of the number of Media Access Control (MAC) addresses observed per frequency channel when different numbers of smartphones are present. For example, the median number of MAC addresses observed per frequency channel when 15 smartphones are present is around 25. The whisker (lower quartile) below the box 424 indicates that between 0-30 MAC addresses (segmented by channel) are observed twenty five percent of the time (lowest quartile) when twenty five smartphones are present. The box 424 indicates that between 30-38 MAC addresses are observed twenty five percent of the time (second quartile) when twenty five smartphones are present. The box 424 indicates that between 38-55 MAC addresses are observed twenty five percent of the time (third quartile) when twenty five smartphones are present. The whisker 428 indicates that between 55-85 MAC addresses are observed twenty five percent of the time (top quartile) when twenty five smartphones are present. FIG. 4B also shows outlier data (e.g., displayed above whisker 428) captured for the different numbers of smartphones.

MAC address randomization is specified by the IEEE 802.8 standard defining Wi-Fi specifications as a security feature to protect device anonymity in probe requests. However, the IEEE 802.8 standard does not explicitly specify broadcast cadence behavior (time between two consecutive probe requests). Hence, the task of passively counting devices based on probe requests can be challenging. Fully randomized MAC address rotation makes it a non-trivial problem to determine whether two probe requests with different MAC addresses came from the same device. Similarly, determining whether ten different probe requests came from one device or ten different devices poses a challenge. In addition, the apparently random broadcast cadence behavior poses challenges to determining a linear relationship of a number of electronic devices present based on a number of Wi-Fi probe requests observed. The disclosed approaches to counting the number of electronic devices present is based on training a machine learning regression model with temporal features to address MAC address randomization. The disclosed approaches are based on a framework defined to generate and prepare training sets for training the machine learning model, the type of information input to the machine learning model (feature extraction and engineering), and training of the model itself.

When an electronic device broadcasts Wi-Fi probe requests (including MAC addresses), the electronic device typically searches across multiple frequency channels to find a suitable connection. The IEEE 802.8 standard specifies a limited number of frequency channels for Wi-Fi probe request communication, where each frequency channel corresponds to a different frequency range. Most electronic devices were observed, using the disclosed embodiments, to probe across different frequency channels when searching for available Wi-Fi networks. If all this observed data (Wi-Fi probe requests) is collected and fed into the machine learning model, noise can result in the data because a single electronic device can emit many Wi-Fi probe requests across different frequency channels, which could result in the machine learning model counting the Wi-Fi probe requests are coming from multiple unique devices. Therefore, separating the number of Wi-Fi probe requests and observed metadata field values per frequency channel reduces the regression model error. Regression models and error values are described in more detail with reference to FIG. 8.

Figure 4C:
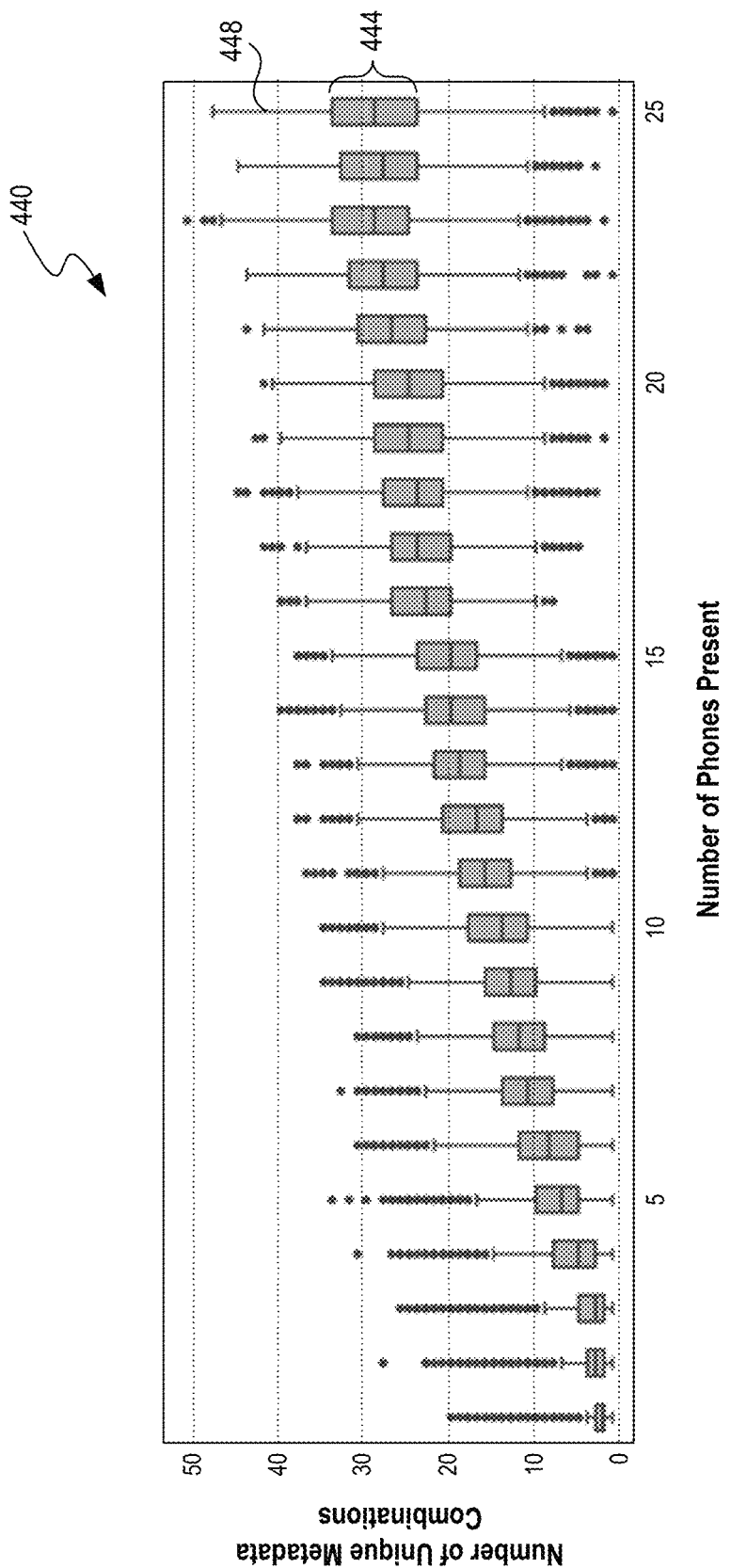
FIG. 4C is a drawing that illustrates an example box-and-whisker plot of a number of unique combinations of data values observed in selected metadata fields when different numbers of smartphones are present.

FIG. 4C is a drawing that illustrates an example box-and-whisker plot 440 of the number of unique combinations of data values observed in selected metadata fields when different numbers of smartphones are present. For example, the median number of unique combinations of data values observed when 15 smartphones are present is around 20. The whisker (lower quartile) below the box 444 indicates that between 8-23 unique combinations of data values are observed twenty five percent of the time (lowest quartile) when twenty five smartphones are present. The box 444 indicates that between 23-28 unique combinations of data values are observed twenty five percent of the time (second quartile) when twenty five smartphones are present. The box 444 indicates that between 28-33 unique combinations of data values are observed twenty five percent of the time (third quartile) when twenty five smartphones are present. The whisker 448 indicates that between 33-48 unique combinations of data values are observed twenty five percent of the time (top quartile) when twenty five smartphones are present. FIG. 4C also shows outlier data (e.g., displayed below the lower whisker) captured for the different numbers of smartphones.

In some implementations, an extracted feature vector (described in more detail with reference to FIG. 6) indicates a unique combination of the data values present in at least two of the metadata fields. For example, in addition to engineering features based on the number of unique data values observed in single metadata fields, features are also generated from combinations of metadata fields. The number of unique combinations of data values in selected metadata fields is determined for each snapshot (one or more timeframes). For example, the two fields named "ht_capabilities" and "supported_rates" are combined, and the number of unique combinations of data values in those fields over a relevant time frame is determined. Multiple instances of the same device type (e.g., two different iPhone 12™ devices) can generate similar metadata values in Wi-Fi probe requests, which can pose a challenge for counting the two smartphones as two unique devices. Determining a unique combination of the data values present in selected metadata fields is used to solve this problem. Two similar devices can have at least one differing data value in selected metadata fields of Wi-Fi probe requests. Therefore, if the data values in at least one field are different, the combination of data values in selected metadata fields will also be different. The use of a combination of data values in selected metadata fields as a feature thus increases the ability of the machine learning model to determine that different electronic devices of the same type are in fact different electronic devices, improving accuracy of the disclosed processes.

Figure 4D:
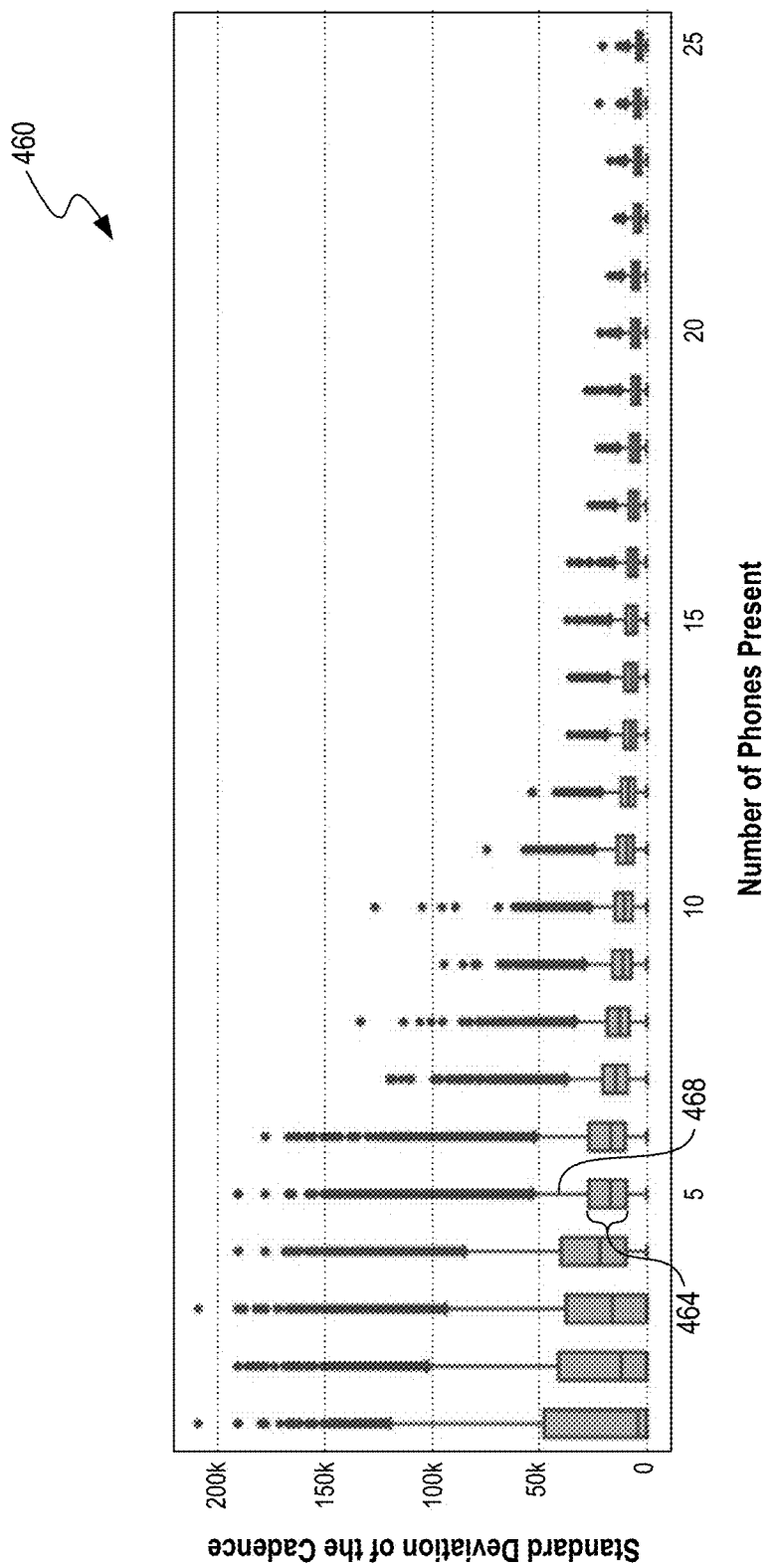
FIG. 4D is a drawing that illustrates an example an example box-and-whisker plot of a standard deviation of the cadence of Wi-Fi probe requests across multiple timeframes when different numbers of smartphones are present.

FIG. 4D is a drawing that illustrates an example box-and-whisker plot 460 of the standard deviation of the cadence of Wi-Fi probe requests across multiple timeframes when different numbers of smartphones are present. Bluetooth or cellular signals are used in some implementations. For example, the median standard deviation of the cadence observed when five smartphones are present is around 15 K. The whisker (lowest quartile) below the box 464 indicates that the standard deviation of the cadence is between 0-7 K twenty five percent of the time when five smartphones are present. The box 464 indicates that the standard deviation of the cadence is between 7-15 K twenty five percent of the time (second quartile) when five smartphones are present. The box 464 indicates that the standard deviation of the cadence is between 15-25 K twenty five percent of the time (third quartile) when five smartphones are present. The whisker 468 indicates that the standard deviation of the cadence is between 25-55 K twenty five percent of the time (top quartile) when twenty five smartphones are present. FIG. 4C also shows outlier data (e.g., displayed above whisker 468) captured for the different numbers of smartphones.

The cadence of the Wi-Fi probe requests is used to derive features for the machine learning model. The machine learning model is provided with statistics about the Wi-Fi probe request cadence distribution, such as percentiles, standard deviation, and detected bursts. A burst occurs when multiple Wi-Fi probe requests are observed within a shorter timeframe. Features based on the cadence of Wi-Fi probe requests can have an inverse relationship to the number of electronic devices present. While the number of Wi-Fi probe requests is positively correlated to the number of electronic devices present, the cadence statistics are negatively correlated to the number of electronic devices present. For example, a larger number of electronic devices present would emit more Wi-Fi probe requests. As the volume of Wi-Fi probe requests increases, less time passes between consecutive Wi-Fi probe requests. Using features based on the cadence of Wi-Fi probe requests enables the machine learning model to address situations where fewer devices are highly active versus situations where more electronic devices are present. While the two situations can have a similar total number of Wi-Fi probe requests, the standard deviation and percentiles of the cadence of Wi-Fi probe requests enable the machine learning model to differentiate between the situations.

Figure 5:
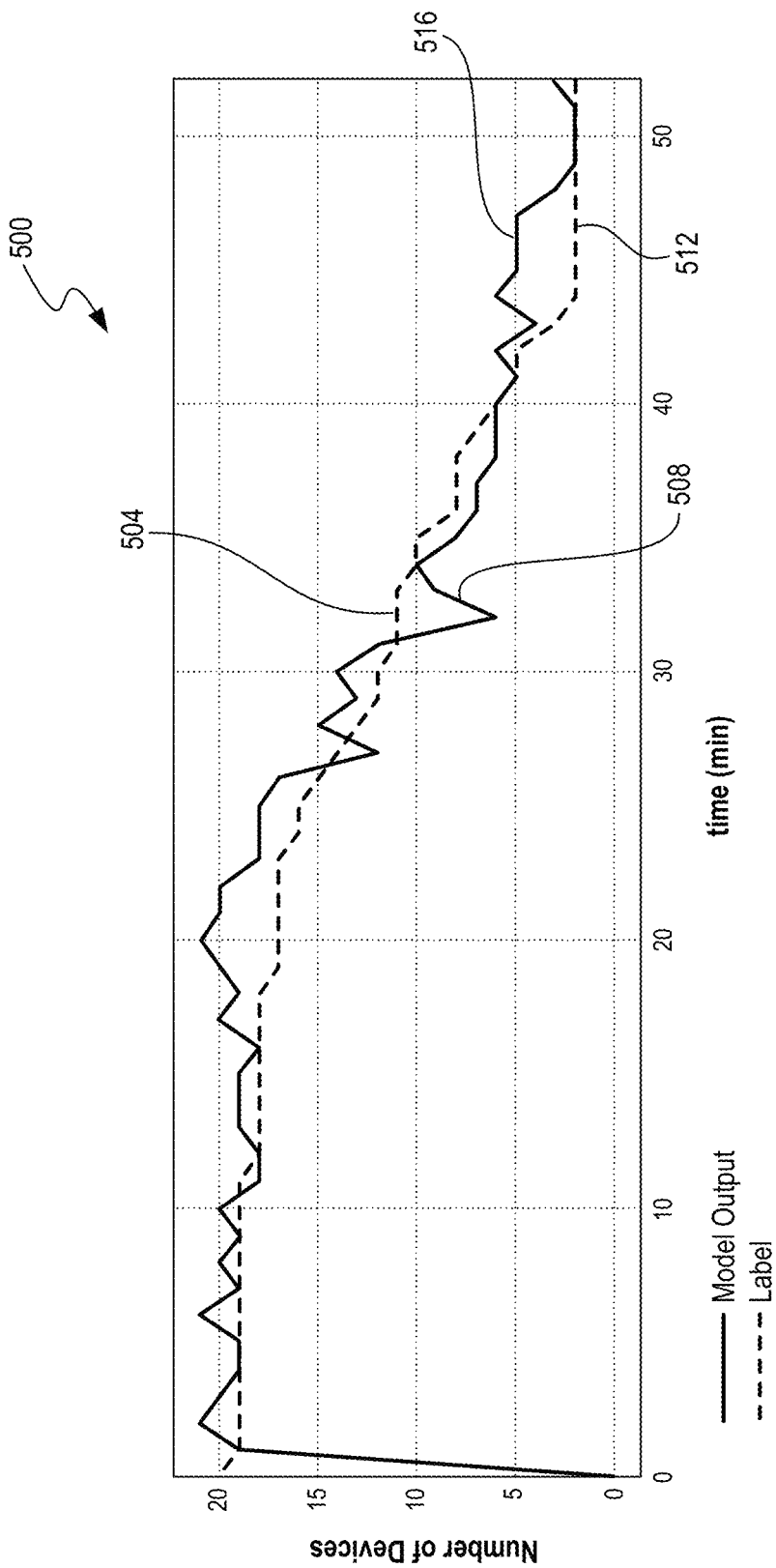
FIG. 5 is a drawing that illustrates an example number of electronic devices determined to be present across different timeframes.

FIG. 5 is a drawing 500 that illustrates an example number of electronic devices determined to be present across different timeframes. When simulated scenarios representing the presence of electronic devices for training the machine learning model are created, a portion of the training set generated can be used as an independent holdout sample (validation set) to evaluate model accuracy. Model validation methods are described in more detail with reference to FIG. 8. For example, in the timeframe between 30-40 minutes shown by FIG. 5, the number 508 of electronic devices determined to be present by the trained machine learning model is a little lower than the number 504 of electronic devices determined to be present by a labeled validation set. In the timeframe between 40-50 minutes shown by FIG. 5, the number 516 of electronic devices determined to be present by the trained machine learning model is a little higher than the number 512 of electronic devices determined to be present by the labeled validation set. Such differences in the number of electronic devices determined to be present can be used to further train the machine learning model.

In addition to the feature types already described herein, a mode (most common value) of the data values in each Wi-Fi probe request metadata field can be used. Bluetooth or cellular signals are used in some implementations. The mode data value is used to isolate unique electronic devices. Once a set of input training features have been determined, different machine learning model types can be used. machine learning model types and AI model types are described in more detail with reference to FIG. 8. For example, different machine learning model architectures and ensemble approaches, such as Linear Regression, AdaBoost (where the underlying model is Linear Regression and Decision Trees), Random Forests, and Gradient-Boosting Decision Trees can be used. In some implementations, tree-based models show better validation-set accuracy. More specifically, machine learning models using Gradient-Boosting Decision Trees can result in less training and computation time, and higher accuracy.

Figure 6:
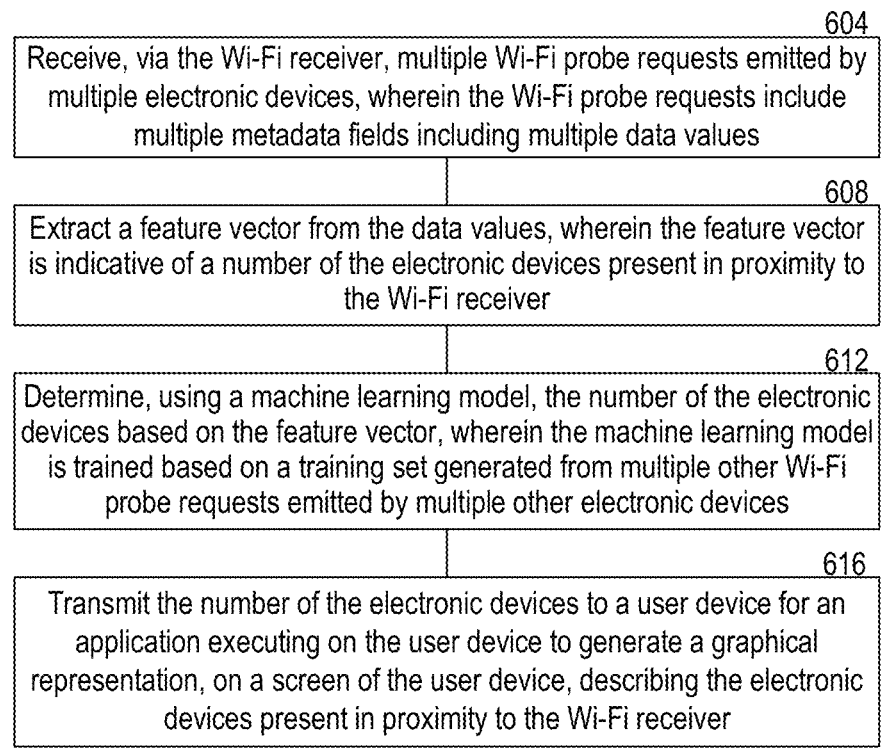
FIG. 6 is a flow diagram that illustrates an example process for detecting presence of electronic devices.

FIG. 6 is a flow diagram that illustrates an example process for detecting presence of electronic devices. In some implementations, the process is performed by computer device 120 or cloud server 132 illustrated and described in more detail with reference to FIG. 1. In some implementations, the process is performed by a computer system, e.g., example computer system 900 illustrated and described in more detail with reference to FIG. 9. Particular entities, for example, AI system 800, perform some or all of the steps of the process in other implementations. The AI system 800 is illustrated and described in more detail with reference to FIG. 8. Likewise, implementations can include different and/or additional steps or can perform the steps in different orders.

The process shown by FIG. 6 detects presence of one or more electronic devices in proximity to a Wi-Fi receiver (in regular operation). A Bluetooth receiver is used in some implementations. Example electronic devices 104, 108, 82, 86, 124 are illustrated and described in more detail with reference to FIG. 1. A significant challenge posed by traditional security systems is maintaining privacy while ensuring safety. The disclosed technology accomplishes this by analyzing passive radio frequency (RF) signals, eliminating the need for intrusive cameras or microphones in homes or workplaces.

Figure 7:
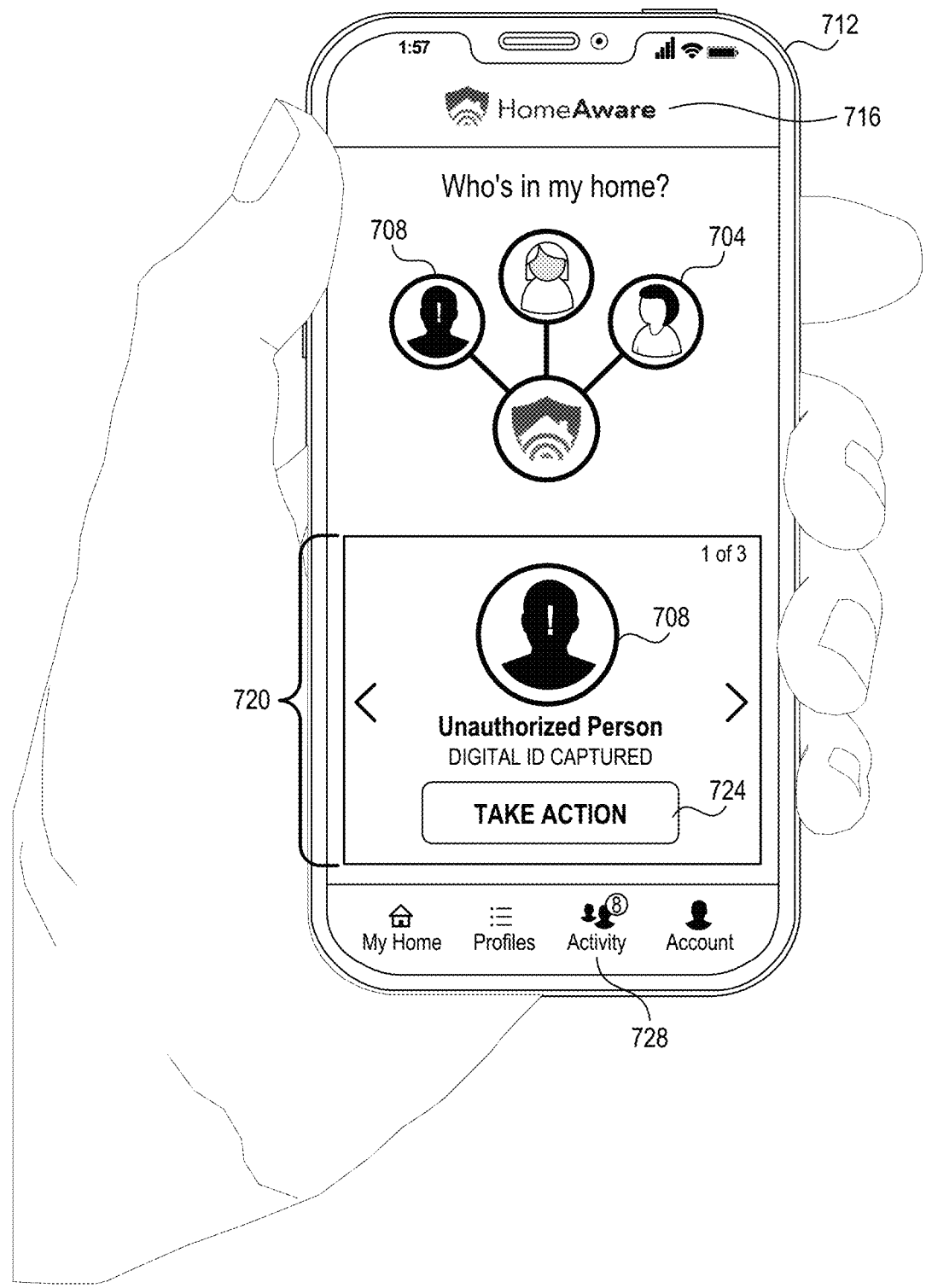
FIG. 7 is a drawing that illustrates an example software application operating on a user device.

In act 604, a computer system receives multiple Wi-Fi probe requests emitted by the electronic devices. Bluetooth or cellular signals are used in some implementations. The Wi-Fi probe requests are received via a Wi-Fi receiver (e.g., within computer device 120). An example Wi-Fi probe request 136 is illustrated and described in more detail with reference to FIG. 1. The Wi-Fi probe requests are received by the computer device 120 and can be sent to cloud server 132 for training a machine learning model or for determining presence of the electronic devices. In some implementations, the computer device 120 determines presence of the electronic devices and/or trains the machine learning model (e.g., to recognize known devices that a user specifies via user device 140 shown by FIG. 1). An example known device is illustrated in FIG. 7. The Wi-Fi probe requests include multiple metadata fields including multiple data values as described in more detail with reference to FIG. 1.

In act 608, the computer system extracts a feature vector from the data values. Feature extraction is described in more detail with reference to FIGS. 1 and 8. The feature vector is indicative of a number of the electronic devices present in proximity to the Wi-Fi receiver (e.g., within or near a home or business). The feature extraction performed to transform the Wi-Fi probe requests into training sets is similar to or the same as the transformation performed in functional operation (when real-time Wi-Fi probe requests received are processed to determine a number of the electronic devices present.

In act 612, the computer system determines, using a machine learning model, the number of the electronic devices present based on the feature vector. The amount of time that an electronic device needs to be in proximity to the Wi-Fi receiver to be detected can depend on the broadcast activity of the electronic device. When an electronic device emits a Wi-Fi probe request, the Wi-Fi probe request is processed as a data point in real time and incorporated into the machine learning model determinations. In some implementations, the machine learning model determines a number of unique electronic devices observed every one minute. Electronic devices typically emit Wi-Fi probe requests regularly, and an electronic device in proximity to the Wi-Fi receiver can be sensed within seconds. In some scenarios, if an electronic device is in a "sleep mode" or "quiet mode" (e.g., to reduce power consumption), it can take 30 seconds to over a minute to emit signals. In such scenarios, sensing presence of the electronic device can be delayed until the electronic device emits signals.

In some implementations, Received Signal Strength Indicator (RSSI) of signals received from an electronic device is used as a filtering criteria to avoid counting remote electronic devices that are too far from the Wi-Fi receiver. For example, such electronic devices may be in a neighboring house or can belong to a person driving past the house where the Wi-Fi receiver is. The RSSI is a measurement of the power present in a received radio signal. A cutoff can be added to the processing to exclude Wi-Fi probe requests that are less than an RSSI cutoff (weaker signal strengths). The cutoff value can be varied to account for the natural variation in signal strengths observed across different homes.

As described in more detail with reference to FIG. 1, the machine learning model is trained based on a training set generated from other Wi-Fi probe requests (training Wi-Fi probe requests) emitted by electronic devices (training electronic devices). The electronic devices are used to train the machine learning model before the trained machine learning model is used to detect presence of and differentiate between electronic devices in functional operation.

In act 616, the computer system transmits the number of the unique electronic devices counted to a user device. An example user device 140 is illustrated and described in more detail with reference to FIG. 1. For example, the computer system can be computer device 120 or cloud server 132 shown by FIG. 1. In some implementations, the computer system and the user device are connected to a Wi-Fi network (a home or business Wi-Fi network). For example, the computer device 120 and user device are connected to a Wi-Fi modem or router at a home, or the cloud server 132 is connected to the home Wi-Fi network over network 128 shown by FIG. 1. The computer system (computer device 120 or cloud server 132) performs the process of FIG. 6 and transmits the number of unique electronic devices present to the user device via the Wi-Fi network. When the computer system is a cloud server, the user device can be connected to the cloud server via a cellular connection. The user device can be located remotely to the home or business, such as when the user is traveling. In such implementations, the cloud server transmits the number of the electronic devices to the user device via the cellular connection.

An application executes on the user device to generate a graphical representation on a screen of the user device. An example graphical representation of an example application is shown by FIG. 7. The graphical representation describes the electronic devices detected and identified to be present in proximity to the Wi-Fi receiver (e.g., in or near a home or business).

The application can indicate known devices 704 (see FIG. 7) whose details have been programmed into the application.

For example, the known devices are identified from known data values that they broadcast in Wi-Fi probe requests. The application enhances situational awareness by providing real-time insights into the number and types of electronic devices present in an area. For instance, homeowners can be alerted to unexpected or excessive device activity, helping them stay informed about their surroundings. Moreover, the disclosed technology helps detect anomalies in physical presence.

In some implementations, the Wi-Fi receiver is connected to a Wi-Fi network at a home or business, and at least one of the electronic devices lacks a connection to the Wi-Fi network. The Wi-Fi probe requests received are network discovery tools: Wi-Fi enabled devices will emit probe requests to obtain information about and connect to nearby Access Points that provide Internet connectivity. For example, an electronic device emits respective Wi-Fi probe requests to search for the Wi-Fi network. Therefore, the disclosed technology can identify unfamiliar devices 708 (see FIG. 7) entering a location, such as a home or a commercial space, without the need for these devices to connect to a Wi-Fi network. The disclosed methods thus enable the identification of potential security threats or unauthorized access.

FIG. 7 is a drawing that illustrates a software application 716 operating on a user device 712. The software application 716 displays three electronic devices detected to be present. Electronic device 704 is associated with a known user. Information associated with electronic device 704 has previously been added to the software application 716 for the home or business that the user of the software application 716 is associated with. The electronic device 708 detected is an unknown device. A digital ID (e.g., device classification, MAC address, and/or metadata within Wi-Fi probe requests broadcast by electronic device 708) is captured and displayed within section 720 of the graphical representation generated by the software application 716. The user of electronic device 712 can take action 724 in response to the detection of electronic device 708, e.g., notifying a home security service, notifying the police, instructing a home security system to capture images, and/or instructing the software application 716 to block the electronic from access to a home Wi-Fi router.

In some implementations, the software application 716 indicates that more electronic devices than expected are present in a particular home or business associated with the Wi-Fi receiver. To determine that more electronic devices than expected are present, the system 100 of FIG. 1 can identify changes in a count of the unique electronic devices present in proximity to the Wi-Fi receiver. For example, the system 100 determines that more electronic devices than expected are present in a particular home, given the number of residents of the home, the number of electronic devices connected to the home's Wi-Fi network, and/or the proximity to neighboring homes. The system 100 can determine whether specific types of electronic devices identified to be present are more or less concerning. For example, a video game console that is detected can be less concerning (that could indicate a neighbor's child has come over to play video games). It may be more concerning to detect a wireless device that is cross-referenced to a MAC address known to belong to a stolen device, or an electronic device that has never been associated with the Wi-Fi receiver, the user device 712, or the software application 716.

In some implementations, details and identifiers of "known" electronic devices are incorporated into the software application 716 to inform the determination of the "expected number of electronic devices" at a location. For example, if three residents are home and each has an associated smartphone, the expected number of electronic devices would be three. The expected number of electronic devices present can be compared to the number of the electronic devices determined to be present to determine whether anomalous behavior is observed at a location. For example, the software application 716 indicates the expected number of electronic devices at a location, given the number of residents of the home, the number of electronic devices connected to the home's Wi-Fi network, and/or the proximity to neighboring homes. The software application 716 can also indicate the actual number of electronic devices presently observed (from the machine learning model).

In some implementations, the application shown by FIG. 7 or instructions running on a computer system generates an analysis of Wi-Fi probe request management frames, which are broadcast by electronic devices to probe for available Wi-Fi hot spots. Bluetooth or cellular signals are used in some implementations. For example, the application can perform an analysis of localization-based services built on top of probe request frames, identify groups of people having similar behaviors in the way they visit a particular area, and/or leverage information contained in probe request frames to automatically detect if the transmitting device is a smartphone or a laptop. This information can further be used to optimize the network configuration and/or implement services such as management of wide Wi-Fi network or smart content caching approaches.

In some implementations, Wi-Fi probe request frames are used to localize users by creating location-based heat maps, parametric model-based triangulation approaches, and/or fingerprinting. A set of features derived from the analysis of probe requests indicate the timeframe that is used to cluster users in different groups. Groups of users with different behaviors can be highlighted and separated. Moreover, Wi-Fi probe request messages can be used to infer geographical features of users. Further, smartphone/laptop classification can be performed by collecting (and parsing) Wi-Fi management frames without invasive deep packet inspection techniques. The classification framework characterizes each electronic device with a set of features extracted from the probe request frames. A reference set of features captures information on the temporal process of probe request transmission (how frequently probe requests are transmitted) and the power levels used in the probe request transmission. A supervised learning approach is used to train different classifiers to determine the type of transmitting device by extracting its corresponding features.

Figure 8:
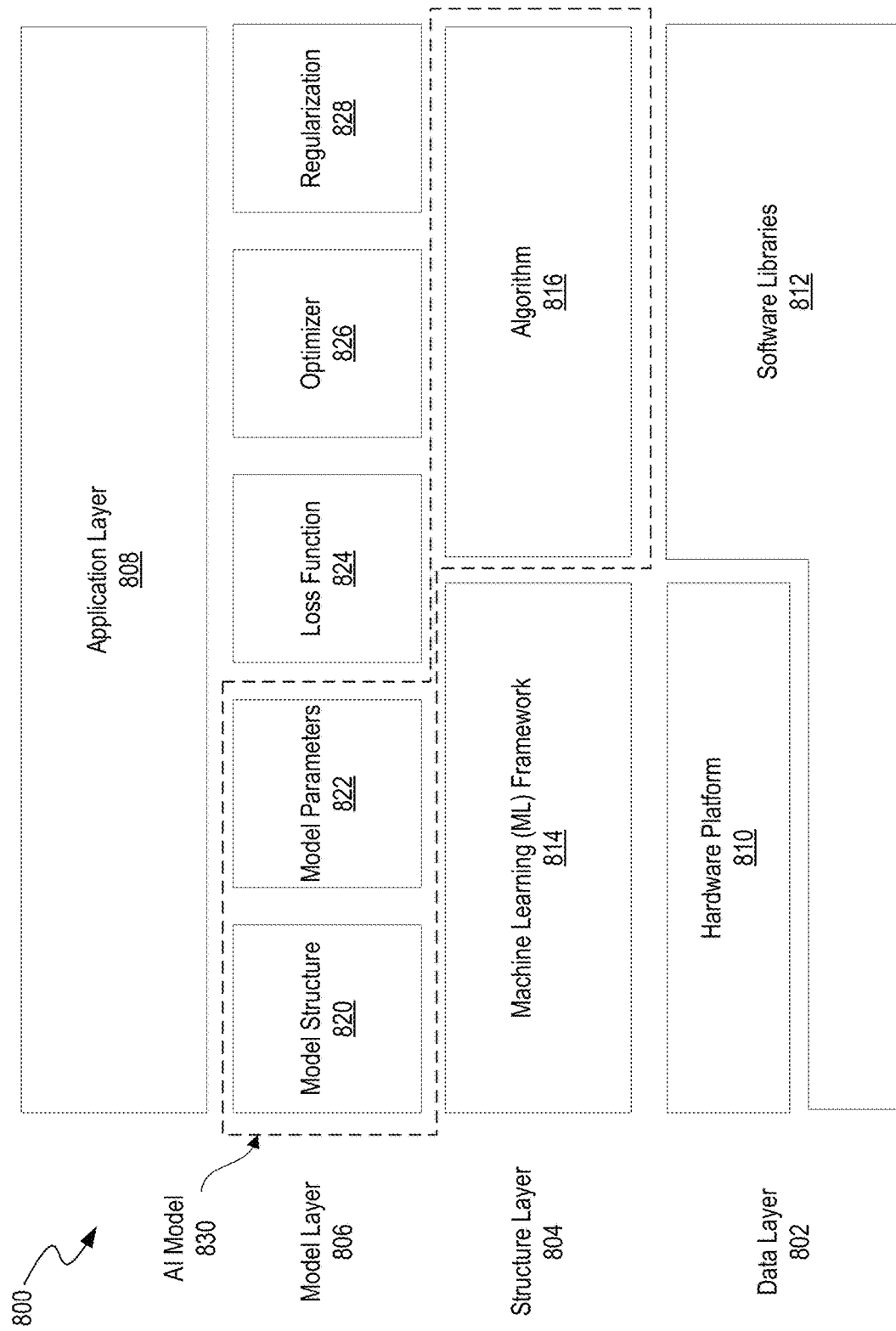
FIG. 8 is a block diagram that illustrates an example artificial intelligence (AI) system that can implement aspects of the present technology.

FIG. 8 is a block diagram that illustrates an example artificial intelligence (AI) system 800 that can implement aspects of the present technology. The AI system 800 is implemented using components of the example computer system 900 illustrated and described in more detail with reference to FIG. 9. For example, the AI system 800 can be implemented using the processor 902 and instructions 908 programmed in the memory 906 illustrated and described in more detail with reference to FIG. 9. Likewise, implementations of the AI system 800 can include different and/or additional components or be connected in different ways.

As shown, the AI system 800 can include a set of layers, which conceptually organize elements within an example network topology for the AI system's architecture to implement a particular AI model 830. The AI model 830 is the same as or similar to the machine learning model described with reference to FIGS. 1-7. Generally, an AI model 830 is a computer-executable program implemented by the AI system 800 that analyzes data to make predictions. Information can pass through each layer of the AI system 800 to generate outputs for the AI model 830. The layers can include a data layer 802, a structure layer 804, a model layer 806, and an application layer 808. The algorithm 816 of the structure layer 804 and the model structure 820 and model parameters 822 of the model layer 806 together form the example AI model 830. The optimizer 826, loss function engine 824, and regularization engine 828 work to refine and optimize the AI model 830, and the data layer 802 provides resources and support for application of the AI model 830 by the application layer 808.

The data layer 802 acts as the foundation of the AI system 800 by preparing data for the AI model 830. As shown, the data layer 802 can include two sub-layers: a hardware platform 810 and one or more software libraries 812. The hardware platform 810 can be designed to perform operations for the AI model 830 and include computing resources for storage, memory, logic, and networking, such as the resources described in relation to FIG. 9. The hardware platform 810 can process amounts of data using one or more servers. The servers can perform backend operations such as matrix calculations, parallel calculations, machine learning (ML) training, and the like. Examples of servers used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 810 can include Infrastructure as a Service (IaaS) resources, which are computing resources, (e.g., servers, memory, etc.) offered by a cloud services provider. The hardware platform 810 can also include computer memory for storing data about the AI model 830, application of the AI model 830, and training data for the AI model 830. The computer memory can be a form of random-access memory (RAM), such as dynamic RAM, static RAM, and non-volatile RAM.

The software libraries 812 can be thought of as suites of data and programming code, including executables, used to control the computing resources of the hardware platform 810. The programming code can include low-level primitives (e.g., fundamental language elements) that form the foundation of one or more low-level programming languages, such that servers of the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI system 800 include Intel Math Kernel Library, Nvidia cuDNN, Eigen, and Open BLAS.

The structure layer 804 can include a machine learning (ML) framework 814 and an algorithm 816. The machine learning framework 814 can be thought of as an interface, library, or tool that allows users to build and deploy the AI model 830. The machine learning framework 814 can include an open-source library, an application programming interface (API), a gradient-boosting library, an ensemble method, and/or a deep learning toolkit that work with the layers of the AI system facilitate development of the AI model 830. For example, the machine learning framework 814 can distribute processes for application or training of the AI model 830 across multiple resources in the hardware platform 810. The machine learning framework 814 can also include a set of pre-built components that have the functionality to implement and train the AI model 830 and allow users to use pre-built functions and classes to construct and train the AI model 830. Thus, the machine learning framework 814 can be used to facilitate data engineering, development, hyperparameter tuning, testing, and training for the AI model 830.

Examples of machine learning frameworks 814 or libraries that can be used in the AI system 800 include TensorFlow, PyTorch, Scikit-Learn, Keras, and Cafffe. Random Forest is a machine learning algorithm that can be used within the machine learning frameworks 814. LightGBM is a gradient boosting framework/algorithm (a machine learning technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying machine learning models.

In some embodiments, the machine learning framework 814 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 800. For example, the machine learning framework 814 can use a cascade of multiple layers of nonlinear processing units for implicit feature extraction and transformation. Each successive layer uses the output from the previous layer as input. The AI model 830 can thus learn in supervised (e.g., classification) and/or unsupervised (e.g., pattern analysis) modes. The AI model 830 can learn multiple levels of representations that correspond to different levels of abstraction, wherein the different levels form a hierarchy of concepts. In this manner, AI model 830 can be configured to differentiate features of interest from background features.

The algorithm 816 can be an organized set of computer-executable operations used to generate output data from a set of input data and can be described using pseudocode. The algorithm 816 can include complex code that allows the computing resources to learn from new input data and create new/modified outputs based on what was learned. In some implementations, the algorithm 816 can build the AI model 830 through being trained while running computing resources of the hardware platform 810. This training allows the algorithm 816 to make decisions without being explicitly programmed to do so. Once trained, the algorithm 816 can run at the computing resources as part of the AI model 830 to make predictions or decisions, improve computing resource performance, or perform tasks. The algorithm 816 can be trained using supervised learning, unsupervised learning, semi-supervised learning, and/or reinforcement learning.

Using supervised learning, the algorithm 816 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include data received from user equipment. The user may label the training data based on one or more classes and trains the AI model 830 by inputting the training data to the algorithm 816. The algorithm determines how to label the new data based on the labeled training data. The user can facilitate collection, labeling, and/or input via the machine learning framework 814. In some instances, the user may convert the training data to a set of feature vectors for input to the algorithm 816. Once trained, the user can test the algorithm 816 on new data to determine if the algorithm 816 is predicting accurate labels for the new data. For example, the user can use cross-validation methods to test the accuracy of the algorithm 816 and retrain the algorithm 816 on new training data if the results of the cross-validation are less than an accuracy threshold.

Supervised learning can involve classification and/or regression. Classification techniques involve teaching the algorithm 816 to identify a category of new observations based on training data and are used when input data for the algorithm 816 is discrete. Said differently, when learning through classification techniques, the algorithm 816 receives training data labeled with categories (e.g., types, makes, and models of devices) and determines how features observed in the training data (e.g., MAC addresses) relate to the categories. Once trained, the algorithm 816 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 816 is continuous. Regression techniques can be used to train the algorithm 816 to predict or forecast relationships between variables. To train the algorithm 816 using regression techniques, a user can select a regression method for estimating the parameters of the model. The user collects and labels training data that is input to the algorithm 816 such that the algorithm 816 is trained to understand the relationship between data features and the dependent variable(s). Once trained, the algorithm 816 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 816 learns patterns from unlabeled training data. In particular, the algorithm 816 is trained to learn hidden patterns and insights of input data, which can be used for data exploration or for generating new data. Here, the algorithm 816 does not have a predefined output, unlike the labels output when the algorithm 816 is trained using supervised learning. Another way unsupervised learning is used to train the algorithm 816 to find an underlying structure of a set of data is to group the data according to similarities and represent that set of data in a compressed format. The systems disclosed herein can use unsupervised learning to identify patterns in data received from a Wi-Fi receiver and so forth.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group.

Examples of clustering techniques density-based methods, hierarchical based methods, partitioning methods, and grid-based methods. In one example, the algorithm 816 may be trained to be a k-means clustering algorithm, which partitions n observations in k clusters such that each observation belongs to the cluster with the nearest mean serving as a prototype of the cluster. Anomaly detection techniques are used to detect unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 816 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 816 include factor analysis, item response theory, latent profile analysis, and latent class analysis.

In some embodiments, the AI system 800 trains the algorithm 816 of AI model 830, based on the training data, to correlate the feature vector to expected outputs in the training data. As part of the training of the AI model 830, the AI system 800 forms a training set of features and training labels by identifying a positive training set of features that have been determined to have a desired property in question, and, in some embodiments, forms a negative training set of features that lack the property in question. The AI system 800 applies machine learning framework 814 to train the AI model 830, that when applied to the feature vector, outputs indications of whether the feature vector has an associated desired property or properties, such as a probability that the feature vector has a particular Boolean property, or an estimated value of a scalar property. The AI system 800 can further apply dimensionality reduction (e.g., via linear discriminant analysis (LDA), PCA, or the like) to reduce the amount of data in the feature vector to a smaller, more representative set of data.

The model layer 806 implements the AI model 830 using data from the data layer and the algorithm 816 and machine learning framework 814 from the structure layer 804, thus enabling decision-making capabilities of the AI system 800. The model layer 806 includes a model structure 820, model parameters 822, a loss function engine 824, an optimizer 826, and a regularization engine 828.

The model structure 820 describes the architecture of the AI model 830 of the AI system 800. The model structure 820 defines the complexity of the pattern/relationship that the AI model 830 expresses. Examples of structures that can be used as the model structure 820 include decision trees, support vector machines, regression analyses, Bayesian networks, Gaussian processes, genetic algorithms, and artificial neural networks (or, simply, neural networks). The model structure 820 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 820 may include one or more hidden layers of nodes between the input and output layers. The model structure 820 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 822 represent the relationships learned during training and can be used to make predictions and decisions based on input data. The model parameters 822 can weight and bias the nodes and connections of the model structure 820. For instance, when the model structure 820 is a neural network, the model parameters 822 can weight and bias the nodes in each layer of the neural networks, such that the weights determine the strength of the nodes and the biases determine the thresholds for the activation functions of each node. The model parameters 822, in conjunction with the activation functions of the nodes, determine how input data is transformed into desired outputs. The model parameters 822 can be determined and/or altered during training of the algorithm 816.

The loss function engine 824 can determine a loss function, which is a metric used to evaluate the AI model's 830 performance during training. For instance, the loss function engine 824 can measure the difference between a predicted output of the AI model 830 and the actual output of the AI model 830 and is used to guide optimization of the AI model 830 during training to minimize the loss function. The loss function may be presented via the machine learning framework 814, such that a user can determine whether to retrain or otherwise alter the algorithm 816 if the loss function is over a threshold. In some instances, the algorithm 816 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 826 adjusts the model parameters 822 to minimize the loss function during training of the algorithm 816. In other words, the optimizer 826 uses the loss function generated by the loss function engine 824 as a guide to determine what model parameters lead to the most accurate AI model 830. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 826 used may be determined based on the type of model structure 820 and the size of data and the computing resources available in the data layer 802.

The regularization engine 828 executes regularization operations. Regularization is a technique that prevents over—and under-fitting of the AI model 830. Overfitting occurs when the algorithm 816 is overly complex and too adapted to the training data, which can result in poor performance of the AI model 830. Underfitting occurs when the algorithm 816 is unable to recognize even basic patterns from the training data such that it cannot perform well on training data or on validation data. The regularization engine 828 can apply one or more regularization techniques to fit the algorithm 816 to the training data properly, which helps constraint the resulting AI model 830 and improves its ability for generalized application. Examples of regularization techniques include lasso (L1) regularization, ridge (L2) regularization, and elastic (L1 and L2 regularization).

In some embodiments, the AI system 800 can include a feature extraction module implemented using components of the example computer system 900 illustrated and described in more detail with reference to FIG. 9. In some embodiments, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 830 by using this reduced representation. In some example embodiments, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

The application layer 808 describes how the AI system 800 is used to solve problems or perform tasks. In an example implementation, the application layer 808 can include instructions executed by the system 100 illustrated and described in more detail with reference to FIG. 1. Referring still to the example implementation, the system 100 can include an AI platform with a plurality of environment-type-specific AI modules. The environment-type-specific AI modules can include the AI system 800 and can be applied to data obtained from the environment to provide environmental mapping. The environment-type-specific AI modules can be trained using environment-type grouped data sets, including environment-type mappings. Environment-type mappings can include layers based on the environment type.

In some implementations, prompt engineering is used to structure text that can be interpreted by a generative AI model. An example prompt can include the following elements: instruction, context, input data, and an output specification. Although a prompt (sometimes referred to as a command set or instruction set) is a natural-language entity (e.g., "Please generate an image of the detected unknown device"), a number of prompt engineering strategies can help structure the prompt in a way that improves the quality of output. These techniques include being precise, specifying context, specifying output parameters, specifying target knowledge domain, and so forth. For example, automatic prompt engineering techniques, can, for example, include using a trained large language model (LLM) to generate a plurality of candidate prompts, automatically score the candidates, and select the top candidates.

Prompt engineering can enable various technical improvements. Technical improvements can include automation of a target process—for instance, a prompt can cause an AI model to generate computer code, to call functions in an API, and so forth. Additionally, technical improvements can include automation of the prompt engineering process itself—for example, an automatically generated sequence of cascading prompts can include sequences of prompts that use tokens from AI model outputs as further instructions, context, inputs, or output specifications for downstream AI models. Technical improvements associated with prompt engineering can further include improved training techniques for LLMs that generate prompts (e.g., chain-of-thought prompting) and improved cost control (e.g., dynamically setting stop sequences to manage the number of automatically generated candidate prompts, dynamically tuning parameters of prompt generation models or downstream models).

Figure 9:
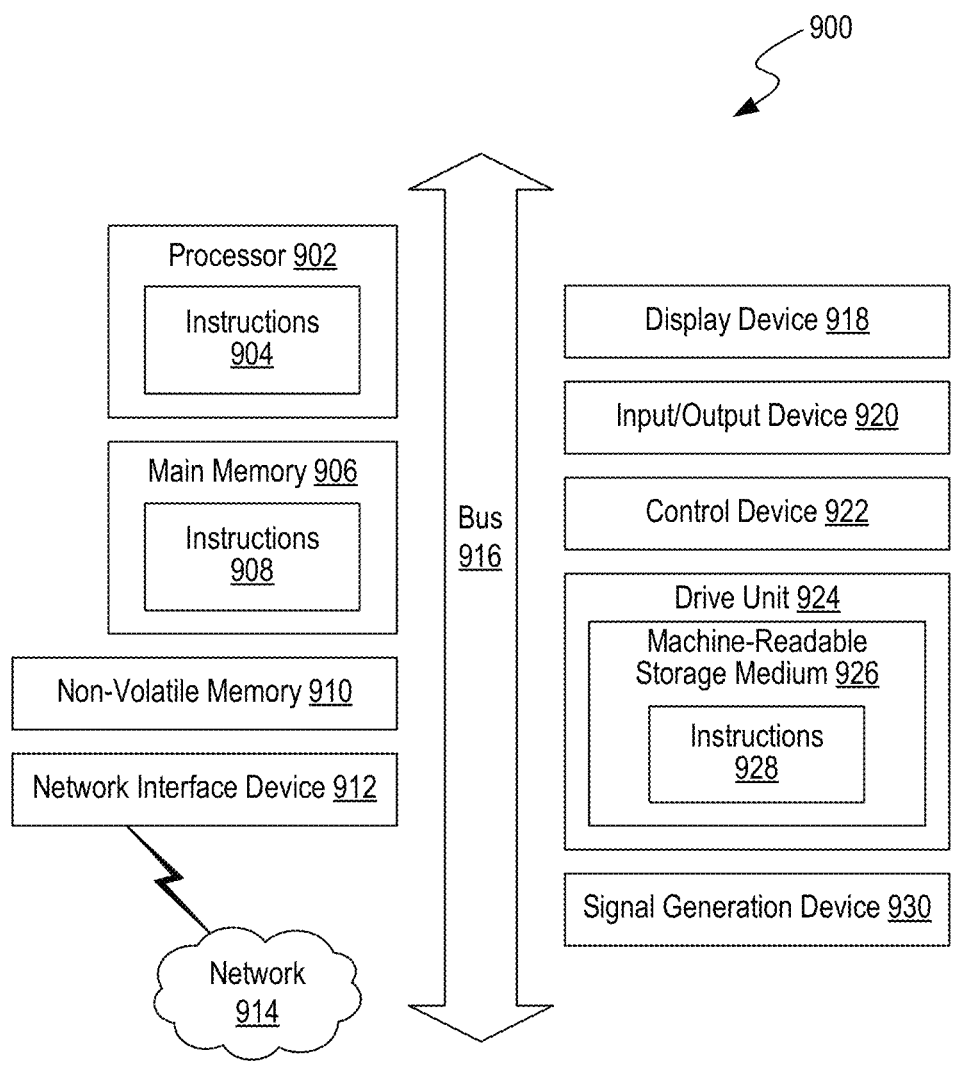
FIG. 9 is a block diagram that illustrates an example computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 900. In some implementations, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the embodiments. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the embodiments disclosed herein should not be taken to imply that the terminology is being redefined herein to be restricted to any specific characteristics, features, or aspects of the embodiments disclosed herein with which that terminology is associated. In general, the terms used in the following examples should not be construed to limit the embodiments disclosed herein to the specific examples disclosed herein, unless the above Detailed Description explicitly defines such terms. Accordingly, the actual scope of the embodiments disclosed herein encompasses not only the disclosed examples, but also all equivalent ways of practicing or implementing the embodiments disclosed herein under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the embodiments disclosed herein can be modified to employ the systems, functions, and concepts of the various references described above to provide yet further implementations of the embodiments disclosed herein.

To reduce the number of claims, certain implementations are presented below in certain forms, but the applicant contemplates various aspects of the embodiments disclosed herein in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer system for detecting presence of multiple electronic devices in proximity to a Wi-Fi receiver, the computer system comprising:
    at least one hardware processor; and
    at least one non-transitory computer-readable storage medium storing instructions, which,
        when executed by the at least one hardware processor, cause the computer system to:
        receive, via the Wi-Fi receiver, multiple Wi-Fi probe requests emitted by the electronic devices,
            wherein the Wi-Fi probe requests include multiple metadata fields including multiple data values;
        fill a constant value into at least one metadata field of at least one Wi-Fi probe request that lacks a data value;
        extract a feature vector from the data values,
            wherein the feature vector is indicative of a number of the electronic devices present in proximity to the Wi-Fi receiver;
        determine, using a machine learning model, the number of the electronic devices based on the feature vector,
            wherein the machine learning model is trained based on a training set generated from multiple other Wi-Fi probe requests emitted by multiple other electronic devices, and
            wherein the machine learning model uses the constant value to track makes and/or models of the electronic devices; and
        transmit the number of the electronic devices to a user device for an application executing on the user device to generate a graphical representation, on a screen of the user device, describing the electronic devices present in proximity to the Wi-Fi receiver.

2. The computer system of claim 1, wherein the computer system and the user device are connected to a Wi-Fi network, and
    wherein the computer system transmits the number of the electronic devices to the user device via the Wi-Fi network.

3. The computer system of claim 1, wherein the Wi-Fi receiver is connected to a Wi-Fi network, and
    wherein at least one of the electronic devices lacks a connection to the Wi-Fi network.

4. The computer system of claim 3, wherein the at least one of the electronic devices emits respective Wi-Fi probe requests to search for the Wi-Fi network.

5. The computer system of claim 1, wherein the computer system is a cloud server,
    wherein the user device is connected to the cloud server via a cellular connection, and
    wherein the cloud server transmits the number of the electronic devices to the user device via the cellular connection.

6. The computer system of claim 1, wherein the Wi-Fi probe requests indicate Media Access Control (MAC) addresses of the electronic devices, manufacturers of the electronic devices, and/or connection capabilities of the electronic devices.

7. The computer system of claim 1, wherein the feature vector indicates a unique combination of the data values present in at least two of the metadata fields.

8. A method performed by a computer system, the method comprising:
    receiving, via a Wi-Fi receiver, multiple Wi-Fi probe requests emitted by multiple electronic devices,
        wherein the Wi-Fi probe requests include multiple metadata fields including multiple data values;
    filling a constant value into at least one metadata field of at least one Wi-Fi probe request that lacks a data value;
    extracting a feature vector from the data values, wherein the feature vector is indicative of a number of the electronic devices present in proximity to the Wi-Fi receiver;

determining, using a machine learning model, the number of the electronic devices based on the feature vector,
wherein the machine learning model is trained based on a training set generated from multiple other Wi-Fi probe requests emitted by multiple other electronic devices, and
wherein the machine learning model uses the constant value to track makes and/or models of the electronic devices; and transmitting the number of the electronic devices to a user device for an application executing on the user device to generate a graphical representation, on a screen of the user device, describing the electronic devices present in proximity to the Wi-Fi receiver.

9. The method of claim 8, wherein the computer system and the user device are connected to a Wi-Fi network, and
wherein the computer system transmits the number of the electronic devices to the user device via the Wi-Fi network.

10. The method of claim 8, wherein the Wi-Fi receiver is connected to a Wi-Fi network, and
wherein at least one of the electronic devices lacks a connection to the Wi-Fi network.

11. The method of claim 10, wherein the at least one of the electronic devices emits respective Wi-Fi probe requests to search for the Wi-Fi network.

12. The method of claim 8, wherein the computer system is a cloud server,
wherein the user device is connected to the cloud server via a cellular connection, and
wherein the cloud server transmits the number of the electronic devices to the user device via the cellular connection.

13. The method of claim 8, wherein the Wi-Fi probe requests indicate Media Access Control (MAC) addresses of the electronic devices, manufacturers of the electronic devices, and/or connection capabilities of the electronic devices.

14. The method of claim 8, wherein the feature vector indicates a unique combination of the data values present in at least two of the metadata fields.

15. At least one non-transitory computer-readable storage medium storing instructions, which, when executed by at least one hardware processor of a computer system, cause the computer system to:
receive, via a Wi-Fi receiver, multiple Wi-Fi probe requests emitted by multiple electronic devices,
wherein the Wi-Fi probe requests include multiple metadata fields including multiple data values;
fill a constant value into at least one metadata field of at least one Wi-Fi probe request that lacks a data value;
extract a feature vector from the data values,
wherein the feature vector is indicative of a number of the electronic devices present in proximity to the Wi-Fi receiver;
determine, using a machine learning model, the number of the electronic devices based on the feature vector,
wherein the machine learning model is trained based on a training set generated from multiple other Wi-Fi probe requests emitted by multiple other electronic devices, and
wherein the machine learning model uses the constant value to track makes and/or models of the electronic devices; and
transmit the number of the electronic devices to a user device for an application executing on the user device to generate a graphical representation, on a screen of the user device, describing the electronic devices present in proximity to the Wi-Fi receiver.

16. The non-transitory computer-readable storage medium of claim 15, wherein the computer system and the user device are connected to a Wi-Fi network, and
wherein the computer system transmits the number of the electronic devices to the user device via the Wi-Fi network.

17. The non-transitory computer-readable storage medium of claim 15, wherein the Wi-Fi receiver is connected to a Wi-Fi network, and
wherein at least one of the electronic devices lacks a connection to the Wi-Fi network.

18. The non-transitory computer-readable storage medium of claim 17, wherein the at least one of the electronic devices emits respective Wi-Fi probe requests to search for the Wi-Fi network.

19. The non-transitory computer-readable storage medium of claim 15, wherein the computer system is a cloud server,
wherein the user device is connected to the cloud server via a cellular connection, and
wherein the cloud server transmits the number of the electronic devices to the user device via the cellular connection.

20. The non-transitory computer-readable storage medium of claim 15, wherein the Wi-Fi probe requests indicate Media Access Control (MAC) addresses of the electronic devices, manufacturers of the electronic devices, and/or connection capabilities of the electronic devices.

* * * * *